(12) United States Patent
Jensen

(10) Patent No.: US 11,503,414 B2
(45) Date of Patent: Nov. 15, 2022

(54) HEARING DEVICE COMPRISING A SPEECH PRESENCE PROBABILITY ESTIMATOR

(71) Applicant: Oticon A/S, Smørum (DK)

(72) Inventor: Jesper Jensen, Smørum (DK)

(73) Assignee: OTICON A/S, Smørum (DK)

( * ) Notice: Subject to any disclaimer, the term of this patent is extended or adjusted under 35 U.S.C. 154(b) by 0 days.

(21) Appl. No.: 17/380,864

(22) Filed: Jul. 20, 2021

(65) Prior Publication Data

US 2021/0352415 A1   Nov. 11, 2021

Related U.S. Application Data

(62) Division of application No. 16/514,231, filed on Jul. 17, 2019, now Pat. No. 11,102,590.

(30) Foreign Application Priority Data

Jul. 18, 2018  (EP) .................................. 18184230

(51) Int. Cl.
  *H04R 25/00*  (2006.01)
  *G10L 15/08*  (2006.01)

(52) U.S. Cl.
  CPC .......... *H04R 25/407* (2013.01); *H04R 25/405* (2013.01); *H04R 25/505* (2013.01);
  (Continued)

(58) Field of Classification Search
  CPC ................ H04R 25/405; H04R 25/407; H04R 25/505; H04R 25/554; H04R 2225/43;
  (Continued)

(56) References Cited

U.S. PATENT DOCUMENTS

| 9,064,502 | B2* | 6/2015 | Taal ........................ G10L 25/69 |
| 9,477,925 | B2 | 10/2016 | Seide et al. |
| 9,697,831 | B2 | 7/2017 | Lesso et al. |
| 10,154,353 | B2 | 12/2018 | Jensen et al. |

(Continued)

FOREIGN PATENT DOCUMENTS

| CA | 2397009 A1 | 2/2003 |
| CN | 104661152 A | 5/2015 |

(Continued)

OTHER PUBLICATIONS

Xu et al. "A Regression Approach to Speech Enhancement Based on Deep Neural Networks", IEEE/ACM Transaction on Audio, Speech, and Language Processing, vol. 23. No. 1, Jan. 2015. p. 7-19.

*Primary Examiner* — Xu Mei
(74) *Attorney, Agent, or Firm* — Birch, Stewart, Kolasch & Birch, LLP

(57) ABSTRACT

A hearing device, e.g. a hearing aid, comprises a) a multitude of input units, each providing an electric input signal representing sound in the environment of the user in a time-frequency representation, wherein the sound is a mixture of speech and additive noise or other distortions, e.g. reverberation, b) a multitude of beamformer filtering units, each being configured to receive at least two, e.g. all, of said multitude of electric input signals, each of said multitude of beamformer filtering units being configured to provide a beamformed signal representative of the sound in a different one of a multitude of spatial segments, e.g. spatial cells, around the user, c) a multitude of speech probability estimators each configured to receive the beamformed signal for a particular spatial segment and to estimate a probability that said particular spatial segment contains speech at a given point in time and frequency, wherein at least one, e.g. all, of the multitude of speech probability estimators is/are implemented as a trained neural network, e.g. a deep neural (Continued)

network. The invention may e.g. be used in hearing aids or communication devices, such as headsets, or telephones, or speaker phones.

9 Claims, 18 Drawing Sheets

(52) U.S. Cl.
CPC ............ *H04R 25/554* (2013.01); *G10L 15/08* (2013.01); *H04R 2225/43* (2013.01); *H04R 2225/51* (2013.01)

(58) Field of Classification Search
CPC ..... H04R 2225/51; G10L 15/08; G10L 15/20; G10L 25/84; G10L 21/02; G10L 21/0208; G10L 21/02082; G10L 21/02085; G10L 21/02087
USPC .................. 381/313, 316, 320; 704/231, 240
See application file for complete search history.

(56) References Cited

U.S. PATENT DOCUMENTS

| | | | |
|---|---|---|---|
| 10,966,034 B2* | 3/2021 | Andersen | ............. H04R 25/507 |
| 11,270,688 B2* | 3/2022 | Lu | ............................ G06N 3/049 |
| 2009/0319268 A1 | 12/2009 | Aumont et al. | |
| 2010/0070274 A1 | 3/2010 | Cho et al. | |
| 2014/0270294 A1 | 9/2014 | Andersen et al. | |
| 2015/0156592 A1 | 6/2015 | Meister et al. | |
| 2017/0133006 A1 | 5/2017 | Lee et al. | |
| 2019/0222943 A1 | 7/2019 | Andersen et al. | |
| 2019/0295553 A1 | 9/2019 | Jung et al. | |
| 2019/0333501 A1 | 10/2019 | Kurtz et al. | |
| 2020/0051549 A1 | 2/2020 | Chen et al. | |

FOREIGN PATENT DOCUMENTS

| | | |
|---|---|---|
| CN | 106683663 A | 5/2017 |
| EP | 2876900 A1 | 5/2015 |
| EP | 3229496 A1 | 10/2017 |

\* cited by examiner

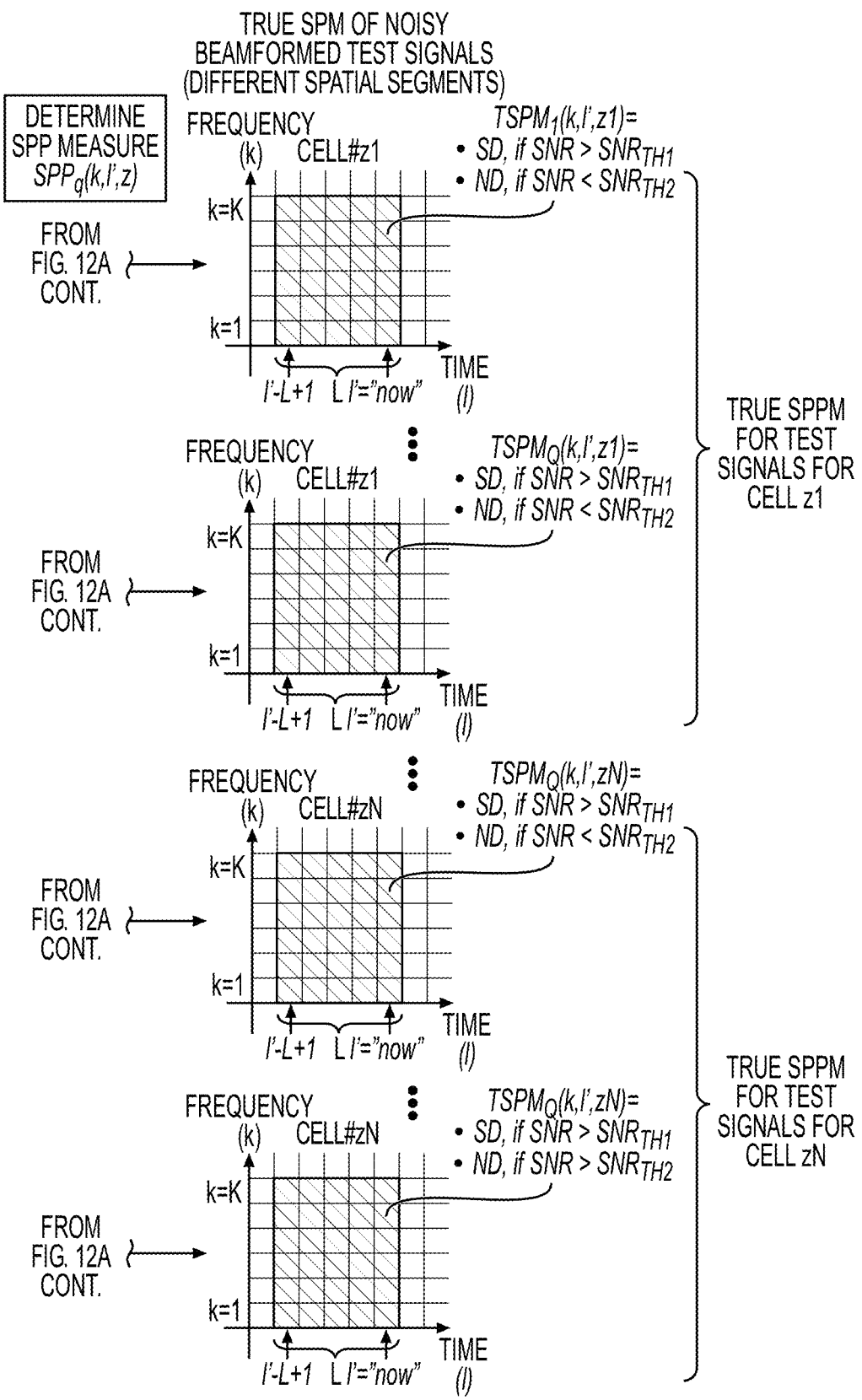
FIG. 12A *(CONT. 2)*

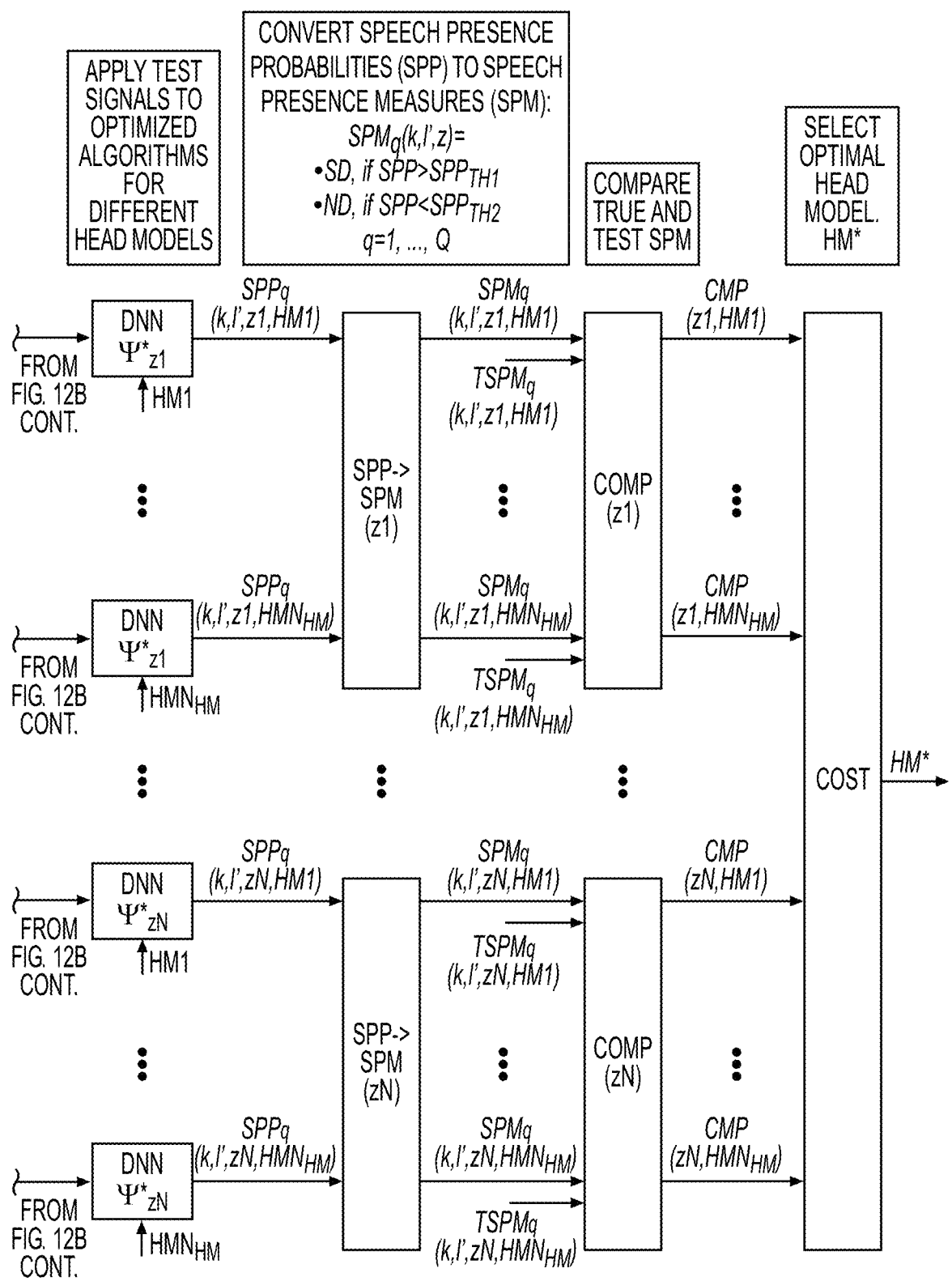
FIG. 12B(CONT. 2)

HEARING DEVICE COMPRISING A SPEECH PRESENCE PROBABILITY ESTIMATOR

This application is a Divisional of copending application Ser. No. 16/514,231, filed on Jul. 17, 2019, which claims priority under 35 U.S.C. § 119(a) to Application No. 18184230.3, filed in Europe on Jul. 18, 2018, all of which are hereby expressly incorporated by reference into the present application.

The present disclosure deals with speech presence probability estimation in hearing devices, e.g. hearing aids, e.g. using algorithms, e.g. neural networks.

A multi-microphone algorithm framework for speech presence probability (SPP) estimation as a function of time, frequency, and spatial position is proposed. Single-microphone algorithms for SPP are key components in most speech processing algorithms, where noisy speech is involved. These algorithms try to decide, based on the noisy signal, which time-frequency regions are dominated by speech, and which are dominated by noise, or—more generally—they estimate the probability of speech presence in each time-frequency region. Quite a number of single-microphone model-based SPP algorithms have been proposed in the context of single-microphone noise reduction, see e.g. [1] and the references therein. These algorithms tend to be computationally simple and work well, especially when the background noise is stationary/non-fluctuating. More recently, deep-learning based algorithms for single-microphone SPP have been proposed, see e.g. [2]. These algorithms typically feed a noisy magnitude spectrum into a deep neural network (DNN), which is trained to estimate which time-frequency regions are dominated by speech and noise, respectively.

In the present application, a multi-microphone, deep-learning based algorithm for SPP estimation is disclosed. The proposed algorithm differs from existing algorithms in that it combines the following features: a) it uses spatial filtering (using M≥2 microphones), leading to better performance than the single-microphone (M=1) based methods proposed so far (see e.g. [2]), b) it uses supervised learning (e.g. neural networks, such as deep neural networks (DNN)) to avoid explicit (and possibly less valid) statistical model assumptions made in traditional algorithms (see e.g. [1]), and c) it relies on a theoretically sound framework for estimating SPPs. Unlike existing methods, the proposed algorithm computes, in each time-frequency region, the probability that a speech signal originates from a particular spatial location/direction.

In an aspect, a hearing device, e.g. a hearing aid is provided. The hearing device comprises a multitude zN (e.g. zN≥2 or 3) of beamformers configured to pick up sound from different spatial segments (e.g. also termed volumes or cells) of an environment around a user wearing the hearing device and to provide respective beamformed signals representative thereof. A (uniquely adapted) speech presence probability (SPP) of each of the different spatial segments is provided based on the respective beamformed signals. The estimation of a speech presence probability of a given spatial segment is e.g. provided based on a neural network (e.g. a deep neural network (DNN)), e.g. trained on a data set comprising beamformed signals of known content for the given spatial part.

A specific property of the speech probability estimators according to the present disclosure is that each spatial cell has an SPP-estimator that is specialized/dedicated to it. In particular, a given set of optimized parameters ($\Psi^*_{ij}$) (e.g. weights of a neural network) for an SPP-estimator related to a given spatial cell has been generated from training data processed (or provided) by a beamformer directed towards this specific spatial cell. This is illustrated by the fact that an SPP-estimator dedicated to one particular spatial cell will NOT perform optimally if applied to another cell. Therefore, the present solution may perform better than a solution applying the same standard SPP to all spatial cells (e.g. the previously mentioned one-microphone solutions).

A Hearing Device:

In an aspect of the present application, a hearing device, e.g. a hearing aid, is provided. The hearing device comprises a multitude of input units, each providing an electric input signal representing sound in the environment of the user in a time-frequency representation, wherein the sound is a mixture of speech and additive noise or other distortions, e.g. reverberation, a multitude of beamformer filtering units, each being configured to receive at least two, e.g. all, of said multitude of electric input signals, each of said multitude of beamformer filtering units being configured to provide a beamformed signal representative of the sound in a different one of a multitude of spatial segments, e.g. spatial cells, around the user.

The hearing device further comprises a multitude of speech probability estimators each configured to receive the beamformed signal for a particular spatial segment and to estimate a probability that said particular spatial segment contains speech at a given point in time and frequency; and wherein at least one, e.g. all, of the multitude of speech probability estimators is/are implemented as a trained neural network, e.g. a deep neural network.

Thereby an improved speech presence probability estimator may be provided.

The hearing device may be adapted to provide that at least one of the input units comprises An input transducer, e.g. a microphone, for providing a time-domain electric input signal representing sound in the environment; and An analysis filter bank for providing the electric input signal in the time frequency representation An input unit may e.g. comprise an analogue to digital converter for providing an analogue electric input signal as digital samples.

The hearing device may be configured to be worn by a user, e.g. at or in an ear or the user (or fully or partially implanted in the head of the user).

Each of the beamformer filtering units may be configured to extract a signal originating from a particular one of the multitude of spatial segments, e.g. a centre location of the spatial segment, while suppressing maximally signals originating from other locations. Preferably, a given one of the beamformer filtering units focus on a unique spatial segment different from all other beamformer filtering units.

The hearing device may comprise a resulting beamformer filtering unit configured to implement a resulting beamformer, which is a linear combination of beamformers directed at each spatial segment, e.g. each cell ($\theta_i$, $r_j$), provided by the multitude of beamformer filtering units, where the coefficients of the linear combination are derived from the speech presence probabilities, and where resulting beamformer filtering unit is configured to provide a resulting beamformed signal. The resulting beamformed signal is e.g. intended to be further processed according to a user's needs (e.g. to compensate for a hearing impairment), and/or to be presented to the user of the hearing device as stimuli perceivable as sound. The coefficients $\underline{w}_{res}(k,l)$ of the linear combination are e.g. given by the following expression:

$$\underline{w}_{res}(k, l) = \sum_{i=1}^{T} P_i(k, l) \cdot \underline{w}_i(k, l)$$

Where k and l are frequency and time indices, respectively, T is the number of spatial segments, and $P_i(k,l)$ are the speech presence probabilities for the $i^{th}$ spatial segment (assumed equal to equal to the estimated speech presence probabilities $\hat{l}*(k,l)$), and $\underline{w}_i(k,l)$ are the beamformer weights for the $i^{th}$ beamformer directed at the $i^{th}$ spatial segment, and T is the number of spatial segments.

The hearing device may comprise or be constituted by a single hearing device comprising the multitude of input units. The hearing device may be constituted by or comprise a hearing aid, a headset, an earphone, an ear protection device or a combination thereof.

The hearing device may be configured to provide that at least one, e.g. all, of the multitude of speech probability estimators is/are implemented as a trained neural network according to the method as described below, in the detailed description of embodiments and in the claims.

In an embodiment, the hearing device is adapted to provide a frequency dependent gain and/or a level dependent compression and/or a transposition (with or without frequency compression) of one or more frequency ranges to one or more other frequency ranges, e.g. to compensate for a hearing impairment of a user. In an embodiment, the hearing device comprises a signal processor for enhancing the input signals and providing a processed output signal.

In an embodiment, the hearing device comprises an output unit for providing a stimulus perceived by the user as an acoustic signal based on a processed electric signal. In an embodiment, the output unit comprises a number of electrodes of a cochlear implant or a vibrator of a hone conducting hearing device. In an embodiment, the output unit comprises an output transducer. In an embodiment, the output transducer comprises a receiver (loudspeaker) for providing the stimulus as an acoustic signal to the user. In an embodiment, the output transducer comprises a vibrator for providing the stimulus as mechanical vibration of a skull bone to the user (e.g. in a bone-attached or bone-anchored hearing device).

In an embodiment, the hearing device comprises an input unit for providing an electric input signal representing sound. In an embodiment, the input unit comprises an input transducer, e.g. a microphone, for converting an input sound to an electric input signal. In an embodiment, the input unit comprises a wireless receiver for receiving a wireless signal comprising sound and for providing an electric input signal representing said sound.

In an embodiment, the hearing device comprises a directional microphone system adapted to spatially filter sounds from the environment, and thereby enhance a target acoustic source among a multitude of acoustic sources in the local environment of the user wearing the hearing device. In an embodiment, the directional system is adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

In an embodiment, the hearing device comprises an antenna and transceiver circuitry (e.g. a wireless receiver) for wirelessly receiving a direct electric input signal from another device, e.g. from an entertainment device (e.g. a TV-set), a communication device (e.g. a telephone), a wireless microphone, or another hearing device. In an embodiment, the direct electric input signal represents or comprises an audio signal and/or a control signal and/or an information signal. In an embodiment, the hearing device comprises demodulation circuitry for demodulating the received direct electric input to provide the direct electric input signal representing an audio signal and/or a control signal e.g. for setting an operational parameter (e.g. volume) and/or a processing parameter of the hearing device. In general, a wireless link established by antenna and transceiver circuitry of the hearing device can be of any type. The link can be one- or two-way. In an embodiment, the wireless link is established between two devices, e.g. between an entertainment device (e.g. a TV) and the hearing device, or between two hearing devices, e.g. via a third, intermediate device (e.g. a processing device, such as a remote-control device, a smartphone, etc.). In an embodiment, the wireless link is used under power constraints, e.g. in that the hearing device is or comprises a portable (typically battery driven) device.

In an embodiment, the wireless link is a link based on near-field communication, e.g. an inductive link based on an inductive coupling between antenna coils of transmitter and receiver parts. In another embodiment, the wireless link is based on far-field, electromagnetic radiation. In an embodiment, the communication via the wireless link is arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

In an embodiment, the communication between the hearing device and the other device is in the base band (audio frequency range, e.g. between 0 and 20 kHz). Preferably, communication between the hearing device and the other device is based on some sort of modulation at frequencies above 100 kHz. Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 (kHz range or in the 5.8 GHz range or in the 60 GHz range (ISM=Industrial, Scientific and Medical, such standardized ranges being e.g. defined by the International Telecommunication Union, ITU). In an embodiment, the wireless link is based on a standardized or proprietary technology. In an embodiment, the wireless link is based on Bluetooth technology (e.g. Bluetooth Low-Energy technology).

In an embodiment, the hearing device is a portable device, e.g. a device comprising a local energy source, e.g. a battery, e.g. a rechargeable battery.

In an embodiment, the hearing device comprises a forward or signal path between an input unit (e.g. an input transducer, such as a microphone or a microphone system and/or direct electric input (e.g. a wireless receiver)) and an output unit, e.g. an output transducer. In an embodiment, the signal processor is located in the forward path. In an embodiment, the signal processor is adapted to provide a frequency dependent gain according to a user's particular needs. In an embodiment, the hearing device comprises an analysis path comprising functional components for analyzing the input signal (e.g. determining a level, a modulation, a type of signal, an acoustic feedback estimate, etc.). In an embodiment, some or all signal processing of the analysis path and/or the signal path is conducted in the frequency domain. In an embodiment, some or all signal processing of the analysis path and/or the signal path is conducted in the time domain.

In an embodiment, an analogue electric signal representing an acoustic signal is converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. In an embodiment, a number of audio samples are arranged in a time frame. In an embodiment, a time frame comprises 64 or 128 audio data samples. Other frame lengths may be used depending on the practical application.

In an embodiment, the hearing devices comprise an analogue-to-digital (AD) converter to digitize an analogue input (e.g. from an input transducer, such as a microphone) with a predefined sampling rate, e.g. 20 kHz. In an embodiment, the hearing devices comprise a digital-to-analogue (DA) converter to convert a digital signal to an analogue output signal, e.g. for being presented to a user via an output transducer.

In an embodiment, the hearing device, e.g. the microphone unit, and or the transceiver unit comprise(s) a TF-conversion unit for providing a time-frequency representation of an input signal. In an embodiment, the time-frequency representation comprises an array or map of corresponding complex or real values of the signal in question in a particular time and frequency range. In an embodiment, the TF conversion unit comprises a filter bank for filtering a (time varying) input signal and providing a number of (time varying) output signals each comprising a distinct frequency range of the input signal. In an embodiment, the TF conversion unit comprises a Fourier transformation unit for converting a time variant input signal to a (time variant) signal in the (time-)frequency domain. In an embodiment, the frequency range considered by the hearing device from a minimum frequency $f_{min}$ to a maximum frequency $f_{max}$ comprises a part of the typical human audible frequency range from 20 Hz to 20 kHz, e,g, a part of the range from 20 Hz to 12 kHz Typically, a sample rate $f_s$ is larger than or equal to twice the maximum frequency $f_{max}$, $f_s \geq 2f_{max}$. In an embodiment, a signal of the forward and/or analysis path of the hearing device is split into a number NI of frequency bands (e.g. of uniform width), where NI is e.g. larger than 5, such as larger than 10, such as larger than 50, such as larger than 100, such as larger than 500, at least some of which are processed individually. In an embodiment, the hearing device is/are adapted to process a signal of the forward and/or analysis path in a number NP of different frequency channels (NP≤NI). The frequency channels may be uniform or non-uniform in width (e.g. increasing in width with frequency), overlapping or non-overlapping.

In an embodiment, the hearing device comprises a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g., a smartphone,), an external sensor, etc.

In an embodiment, one or more of the number of detectors operate(s) on the full band signal (time domain). In an embodiment, one or more of the number of detectors operate(s) on band split signals ((time-) frequency domain), e.g. in a limited number of frequency bands.

In an embodiment, the number of detectors comprises a level detector for estimating a current level of a signal of the forward path. In an embodiment, the predefined criterion comprises whether the current level of a signal of the forward path is above or below a given (L-)threshold value. In an embodiment, the level detector operates on the full band signal (time domain). In an embodiment, the level detector operates on band split signals ((time-) frequency domain).

In a particular embodiment, the hearing device comprises a voice detector (VD) for estimating whether or not (or with what probability) an input signal comprises a voice signal (at a given point in time, and/or frequency, and/or spatial segment). A voice signal is in the present context taken to include a speech signal from a human being. It may also include other forms of utterances generated by the human speech system (e.g. singing). In an embodiment, the voice detector unit is adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). In an embodiment, the voice detector is adapted to detect as a VOICE also the user's own voice. Alternatively, the voice detector is adapted to exclude a user's own voice from the detection of a VOICE.

In an embodiment, the hearing device comprises an own voice detector for estimating whether or not (or with what probability) a given input sound (e.g. a voice, e.g. speech) at a given time, frequency and/or spatial segment originates from the voice of the user of the system. In an embodiment, a microphone system of the hearing device is adapted to be able to differentiate between a user's own voice and another person's voice and possibly from NON-voice sounds.

The segmentation in cells may comprise an own voice segment (including a volume or segment around the user's mouth) for estimating a (own voice) speech presence probability (OV-SPP) from the user of the hearing device. Own voice detection can e.g. be decided (assumed), if the own-voice SPP is above an own voice-threshold. Thereby a binary own voice detector can be provided. In a particular 'own voice mode of operation' of the hearing device (e.g.

during a telephone conversation), the user's own voice is picked up and forwarded to another device (e.g. a telephone or a computer, or similar communication device) via a communication interface.

In an embodiment, the number of detectors comprises a movement detector, e.g. an acceleration sensor. In an embodiment, the movement detector is configured to detect movement of the user's facial muscles and/or bones, e.g. due to speech or chewing (e.g. jaw movement) and to provide a detector signal indicative thereof.

In an embodiment, the hearing device comprises a classification unit configured to classify the current situation based on input signals from (at least some of) the detectors, and possibly other inputs as well. In the present context 'a current situation' is taken to be defined by one or more of
a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);
b) the current acoustic situation (input level, feedback, etc.), and
c) the current mode or state of the user (movement, temperature, cognitive load, etc.);
d) the current mode or state of the hearing device (program selected, time elapsed since last user interaction, etc.) and/or of another device in communication with the hearing device.

In an embodiment, the hearing device further comprises other relevant functionality for the application in question, e.g. compression, feedback cancellation, noise reduction, etc.

In an embodiment, the hearing device comprises a listening device, e.g. a hearing aid, e.g. a hearing instrument, e.g. a hearing instrument adapted for being located at the ear or fully or partially in the ear canal of a user, e.g. a headset, an earphone, an ear protection device or a combination thereof. In an embodiment, the hearing assistance system comprises a speakerphone (comprising a number of input transducers and a number of output transducers, e.g. for use in an audio conference situation), e.g. comprising a beamformer filtering unit, e.g. providing multiple beamforming capabilities.
Use:

In an aspect, use of a hearing device as described above, in the 'detailed description of embodiments' and in the claims, is moreover provided. In an embodiment, use is provided in a system comprising audio distribution. In an embodiment, use is provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method of Providing an Estimate Î* of a Speech Presence Probability:

In an aspect, a method of providing an estimate Î* of a speech presence probability in a sound signal comprising speech and additive noise or other distortions, e.g. reverberation, in a hearing device, e.g. a hearing aid, is furthermore provided by the present application. The hearing device comprises a multitude of input units each providing an electric input signal representing said sound signal in a time-frequency representation (k,l). The method comprises
Providing a subdivision of space around the user in a multitude of spatial segments (i,j);
Providing a speech presence indicator function, which for a given electric input signal indicates whether or not, or to which extent, speech is present in a given spatial segment (i,j) at a given frequency and time (k,l); and
For each spatial segment (i,j);
Providing a first database ($\Psi_{ij}$) of training signals comprising a multitude of pairs of corresponding noisy beamformed signals $X(k,l,\theta_i,r_j)$ representative of sound in the spatial segment in question and associated values of said speech presence indicator function $I(k,l,74_i,r_j)$ in a time frequency representation, wherein said values of said speech presence indicator function represent ground truth values; and
determining optimized parameters ($\Psi^*_{ij}$) of an algorithm, e.g. a neural network (DNN), for estimating said speech presence probability by optimizing, e.g. training, it with at least some of said noisy beamformed signals $X(k,l,\theta_i,r_j)$ and said associated values of said speech presence indicator function $I(k,l,\theta_i,r_j)$ of said first database ($\Psi_{ij}$), the algorithm providing corresponding estimated speech presence indicator values $\hat{I}(k,l,74_i,r_j)$, said optimization of parameters ($\Psi^*i_{ij}$) being conducted under a constraint of minimizing a cost function, e.g. a mean squared estimation error of said estimated speech presence indicator values.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The method may comprise that a multitude of clean electric input signals $S_m(k,l)$, m=1, . . . , M, for each of said multitude of input units are generated (or recorded) for a training database by varying one or more, such as all of
1) the target speech source, e.g. different talkers (e.g. including male, female and child talkers), different speech signals for each talker;
2) the target spatial position ($\theta_i,r_j$), e.g. by generating clean microphone signals by convolving the speech signals from point 1) with impulse responses from various spatial positions (e.g. including from a hearing device user's mouth) to input units, e.g. microphones, located on/at the ears of a user or a model of a user;
3) head size, e.g. different heads having different form and sound propagation properties;
4) input unit, e.g. microphone variation, e.g. different microphone characteristics.

The method may comprise that the noisy beamformed signals $X(k,l,\theta_i,r_j)$ are generated for the training database based on said clean electric input signals $S_m(k,l)$, m=1, . . . , M, by varying one or more, such as all of
a) the additive noise or other distortion type, e.g. cocktail party noise, car cabin noise, competing speakers, other environmental noise, reverberation, etc.,
b) the signal-to-noise ratio (SNR) at which the target signal is typically observed in practice, in the application at hand, e.g., −25 dB≤SNR≤50 dB, e.g. −15 dB≤SNR≤25 dB, or −10 dB≤SNR≤30 dB,
to thereby generate noisy electric input signals $X_m(k,l)$, m=1, . . . , M, corresponding to said clean electric input signals; and by exposing said noisy electric input signals to respective beamformers providing said noisy beamformed signals $X(k,l,\theta_i,r_j)$ representative of sound in the spatial segments in question.

Personalization: The method may comprise the provision of a number of semi-personalized, optimized parameters ($\Psi^*_{ij}$) of an algorithm, e.g. a neural network (e.g. a deep neural network, DNN) for estimating a speech presence probability (SPP) (e.g. for a given spatial segment z). The method may comprise creation of training data based on a number of different head models (e.g. instead of including different head sizes in the training data, cf. '3)' above). The method may comprise providing a number $N_{HM}$ of different head models (e.g. ten, e.g. having different head dimensions or form) for each main type of human being (e.g. male, female, child). The method may comprise the provision of optimized neural networks (DNN) for SPP estimation for each of the number (e.g. 3*10) different head models. The head models may comprise artificial models (e.g. the Head and Torso Simulator (HATS) 4128C from Brüel & Kjær Sound & Vibration Measurement A/S, or the head and torso model KEMAR from GRAS Sound and Vibration A/S, or similar) or real persons (with different heads).

A method of selecting an appropriate optimized se of parameters ($\Psi^*_{ij}$) of an algorithm, e.g. a neural network (DNN), for estimating speech presence probability for a given user (e.g. in a given spatial segment z, or for a multitude of, or all, spatial segments) is provided. The method comprises

- Arranging a user equipped with a hearing device or a pair of hearing devices in a predefined location (e.g. in front of) relative to a test sound source (e.g. a person, such as a hearing care professional (HCP), talking, or a loudspeaker from which sound is being played), the hearing device or hearing devices comprising a multitude of input transducers (e.g. microphones) for providing respective electric input signals representative of sound in the environment of the user:
- Providing a test sound signal from the test sound source, said test sound signal being recorded or otherwise known in an essentially noise free version:
- Receiving by said multitude of input transducers of the hearing device or hearing devices one or more time segments of said test sound signal via acoustic channels from the test sound source to the respective input transducers;
- Providing respective one or more time segments of beamformed test signals for a number of selected (or all) spatial segments from said one or more time segments of said test sound signal received at the respective input transducers, a specific beamformed test signal corresponding to a specific spatial segment z around the user;
- Adding noise to said one or more time segments of said beamformed test signal to provide a test database comprising a multitude of noisy time segments having different signal to noise ratios for one or more of said beamformed test signals, each of said multitude of time segments having a known associated signal to noise ratio or a corresponding measure of speech presence;
- Providing an optimized set of parameters ($\Psi^*_{ij}$) of an algorithm, e.g. a neural network (DNN), for estimating a speech presence probability, for a number $N_{HM}$ of different head models selected among the models for the relevant type of the user, e.g. male, female, child (e.g. optimized using a training data base of sound examples from a multitude of talkers, locations around the user, added noise sources of different types, etc., as outlined above) for one or more spatial segments z;
- Applying said multitude of noisy time segments for said beamformed test signals from said test database to said algorithm, e.g. a neural network (DNN), using each of said optimized set of parameters ($\Psi^*_{ij}$) for estimating a speech presence probability for said number of different head models for said one or more (e.g. all) spatial segments z;
- Comparing the estimated speech presence probability for each of said beamformed test signals, or a measure of speech presence (SPM) derived therefrom, for said algorithm using each of said optimized set of parameters ($\Psi^*_{ij}$) for said number of different head models with the corresponding known measure of speech presence, and providing a difference measure for each head model for said one or more (e.g. all) spatial segments z;
- Selecting the optimized set of parameters ($\Psi^*_{ij}$) of the algorithm, e.g. for the neural network, in dependence of said difference measures, e.g. using a cost function, e.g. by selecting the algorithm exhibiting the smallest difference measure, e.g. to select the optimal set of parameters ($\Psi^*_{ij}$) of the algorithm among the number of head models for said one or more (e.g. all) spatial segments z.

Thereby a personalized speech presence probability estimation is provided (e.g. for a given spatial segment z, or for all spatial segment). The procedure may be executed for a single spatial segment, or repeated for a multitude of, such as all beamformed signals to get personalized SPP for all spatial segments, e.g. N (z=z1,..., zN). The procedure may be repeated for particularly selected spatial cells, e.g. in front of the user, e.g. an own voice spatial cell. In an embodiment, the number of spatial cells is larger than two, such as larger than three. In an embodiment, the number of spatial cells is in a range between three and eight, or between three and 16, or between three and 24 (or 32). In an embodiment, the number of spatial cells is four, e.g. front, back, left right (e.g. relative to a look direction of the user). The spatial cells may be overlapping. The spatial cells may be (essentially) non-overlapping.

For personalization purposes, (essentially noise free, clean) beamformed test signals $S_{q,z}(k,l)$ for a given time frequency tile (k,l) of the $q^{th}$ (clean) time segment of the test database (for spatial segment z), where k and l are frequency and time indices are e.g. recorded in a sound studio, or other location with a predictable acoustic environment, while the user is wearing the specific hearing device (or devices) to be adapted. The beamformed time segments of the test signal $S_{q,z}(k,l)$ is used to create a number of noisy time-segments $X_{q,z}(k,l)$ by adding noise $V_{q,z}(k,l)$ (e.g, of different magnitude), i.e. $X_{q,z}(k,l)=S_{q,z}(k,l)+V_{q,z}(k,l)$. Hence, the signal to noise ratio for a noisy time frequency tile of a given noisy time segment of the beamformed signal (corresponding to a specific spatial segment z) is known, and e.g. expressed as $SNR_{q,z}(k,l)=|S_{q,z}(k,l)|^2/|V_{q,z}(k,l)|^2$.

The SNR values of the test data may e.g. be converted to a speech probability presence, or to a (simpler) measure of speech presence, e.g. with a number of 'states' indicating a degree of speech presence. A measure of speech presence (SPM) may e.g. be defined by two states, a) speech dominated (SD) or b) noise dominated (ND), or e.g. by three states indicating A) speech dominated (SD), B) noise dominated (ND), or C) indeterminate (?). The different states may e.g. be defined by threshold values of SNR, e.g.

$SNR(k,l) > SNR_{th1} \Rightarrow$ tile (k,l) is speech dominated (SD),
$SNR(k,l) < SNR_{th2} \Rightarrow$ tile (k,l) is noise dominated (ND),
where $0 \leq SNR_{th2} \leq SNR_{th1} \leq 1$.

Likewise, speech presence probabilities (SPP) of the algorithms with optimized sets of parameters ($\Psi^*_{ij}$) (e.g. for the number $N_{HM}$ of different head models) may be converted to a measure of speech presence (SPM), e.g. with a number of 'states' indicating a degree of speech presence, e.g.

SPP(k,l)>SPP$_{th1}$ =>tile (k,l) is speech dominated (SD),
SPP(k,l)<SPP$_{th2}$ =>tile (k,l) is noise dominated (ND),
where 0≤SPP$_{th2}$≤SPP$_{th1}$≤1.

Instead of adding noise to the beamformed test signal(s), noise may be added to the respective electric input signals from the input transducers (and noisy beamformed test signals may be generated by respective beamformers of the hearing device for the different spatial segments).

A Method of Operating a Hearing Device:

In an aspect, a method of operating a hearing device, e.g. a hearing aid, is furthermore provided. The method comprises providing a multitude of electric input signals representing sound in the environment of the user in a time-frequency representation, wherein the sound is a mixture of speech and additive noise or other distortions, e.g. reverberation;

providing a multitude of beamformed signals, each being representative of the sound in a different one of a multitude of spatial segments, e.g. spatial cells, around the user, and each being based on at least two, e.g. all, of said multitude of electric input signals;

providing for each of said multitude of spatial segments an estimate of a probability $P_{ij}(k,l)$ that the spatial segment in question contains speech at a given point in time and frequency in dependence of the beamformed signals; and wherein at least one, e.g. all, of the multitude of estimates of speech probability is/are provided by a trained neural network, e.g. a deep neural network.

The method may comprise that the at least one of the estimates of speech probability is provided by a neural network trained according to the method of providing an estimate Î* of a speech presence probability described above, in the detailed description of embodiments and in the claims.

The method may comprise providing a resulting beamformed signal, which is a linear combination of said multitude of beamformed signals directed at each spatial segment, e.g. each cell ($\theta_i$, $r_j$), where coefficients $\underline{w}_{res}(k,l)$ of the linear combination are derived from the speech presence probabilities $P_{ij}(k,l)$, and the beamformer weights $w_{ij}(k,l)$ for providing said multitude of beamformed signals.

The coefficients $w_{res}(k,l)$ of the linear combination are e.g. given by the following expression:

$$\underline{w}_{res}(k,l) = \Sigma_{i=1}^{T} \Sigma_{j=1}^{R} P_{ij}(k,l) \cdot \underline{w}_{ij}(k,l)$$

where k and l are frequency and time indices, respectively, T×R is the number of spatial segments (cf. e.g. FIG. 2), and $P_{ij}(k,l)$ are equal to the estimated speech presence probabilities Î*(k,l) for the (i,j)$^{th}$ spatial segment, and $\underline{w}_{ij}(k,l)$ are the beamformer weights for the (i,j)$^{th}$ beamformer directed at the (i,j)$^{th}$ spatial segment. The coefficients $\underline{w}_{res}(k,l)$ of the linear combination and the beamformer weights for the individual beamformers are here each represented by a M×1 vector (M rows, 1 column), where M is the number of input units, e.g. microphones.

The resulting beamformed signal $Y_{res}$ may be given by the expression:

$$Y_{res}(k,l) = \underline{X}(k,l) \cdot \underline{w}_{res}(k,l)^T$$

where superscript $^T$ denotes transposition. The beamformed signal $Y_{res}$ can thus be expressed as the linear combination $$Y_{res} = X_1 \cdot w_{1,res} + X_2 \cdot w_{2,res} + X_M w_{M,res},$$

where each of the M noisy electric input signals [$X_1$, $X_2$, ..., $X_M$] and the coefficients [$w_{1,res}$, $w_{2,res}$, ..., $w_{M,res}$] (and hence the beamformed signal $Y_{res}$) are defined in a time frequency representation (k,l).

A Computer Readable Medium:

In an aspect, a tangible computer-readable medium storing a computer program comprising program code means for causing a data processing system to perform at least some (such as a majority or all) of the steps of the method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising first and second hearing devices as described above, in the 'detailed description of embodiments', and in the claims is provided. Each of the first and second hearing devices comprises antenna and transceiver circuitry configured to establish a communication link between them, and each comprising at least one of the multitude of input units. In an embodiment, the hearing system is adapted to implement a binaural hearing system, e.g. a binaural hearing aid system.

The hearing system may comprise an auxiliary device, e.g. for processing data and/or for implementing a user interface.

In an embodiment, the hearing system is adapted to establish a communication link between the hearing device and the auxiliary device to provide that information (e.g. control and status signals, possibly audio signals) can be exchanged or forwarded from one to the other.

In an embodiment, the hearing system comprises an auxiliary device, e.g. a remote control, a smartphone, or other portable or wearable electronic device, such as a smartwatch or the like.

In an embodiment, the auxiliary device is or comprises a remote control for controlling functionality and operation of the hearing device(s). In an embodiment, the function of a remote control is implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme).

In an embodiment, the auxiliary device is or comprises an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

An APP:

In a further aspect, a non-transitory application, termed an APP, is furthermore provided by the present disclosure. The APP comprises executable instructions configured to he executed on an auxiliary device to implement a user interface for a hearing device or a hearing system described above in the 'detailed description of embodiments', and in the claims. In an embodiment, the APP is configured to run on cellular phone, e.g. a smartphone, or on another portable device allowing communication with said hearing device or said hearing system.

The user interface may be configured to allow a user to influence, such as determine, the configuration of the spatial segments around the user, e.g. by choosing among a number of predefined configurations, e.g. between a configuration as shown in FIG. 2 and a configuration as shown in FIG. 6.

Definitions:

In the present context, a 'hearing device' refers to a device, such as a hearing aid, e.g. a hearing instrument, or an active ear-protection device, or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing device may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing device may comprise a single unit or several units communicating electronically with each other. The loudspeaker may be arranged in a housing together with other components of the hearing device, or may be an external unit in itself (possibly in combination with a flexible guiding element, e.g. a dome-like element).

More generally, a hearing device comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing devices, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing device and/or for storing information (e.g. processed information, e.g. provided by the signal processing circuit), e.g. for use in connection with an interface to a user and/or an interface to a programming device. In some hearing devices, the output unit may comprise an output transducer, such as e.g. a loudspeaker for providing an air-borne acoustic signal or a vibrator for providing a structure-borne or liquid-borne acoustic signal. In some hearing devices, the output unit may comprise one or more output electrodes for providing electric signals (e.g. a multi-electrode array for electrically stimulating the cochlear nerve). In an embodiment, the hearing device comprises a speakerphone (comprising a number of input transducers and a number of output transducers, e.g. for use in an audio conference situation).

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing device, e.g. a hearing aid, may be adapted to a particular user's needs, e.g. a hearing impairment. A configurable signal processing circuit of the hearing device may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing device via an interface to a programming device (fitting system), and used by a processing algorithm executed by the configurable signal processing circuit of the hearing device.

A 'hearing system' refers to a system comprising one or two hearing devices, and a 'binaural hearing system' refers to a system comprising two hearing devices and being adapted to cooperatively provide audible signals to both of the user's ears. Hearing systems or binaural hearing systems may further comprise one or more 'auxiliary devices', which communicate with the hearing device(s) and affect and/or benefit from the function of the hearing device(s). Auxiliary devices may be e.g. remote controls, audio gateway devices, mobile phones (e.g. smartphones), or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person. Hearing devices or hearing systems may e.g. form part of or interact with public-address systems, active ear protection systems, handsfree telephone systems, car audio systems, entertainment (e.g. karaoke) systems, teleconferencing systems, classroom amplification systems, etc.

Embodiments of the disclosure may e.g. be useful in applications such as hearing aids or communication devices, such as headsets, or telephones, or speaker phones.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIG. 2), FIG. 7 schematically illustrates a neural network for determining speech presence probability estimator (SPPE) $\hat{I}^*(k,l,\theta_i,r_j)$ from a noisy input signal in a time-frequency representation.

The figures are schematic and simplified for clarity, and they just show details, which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids.

Figure 1A:
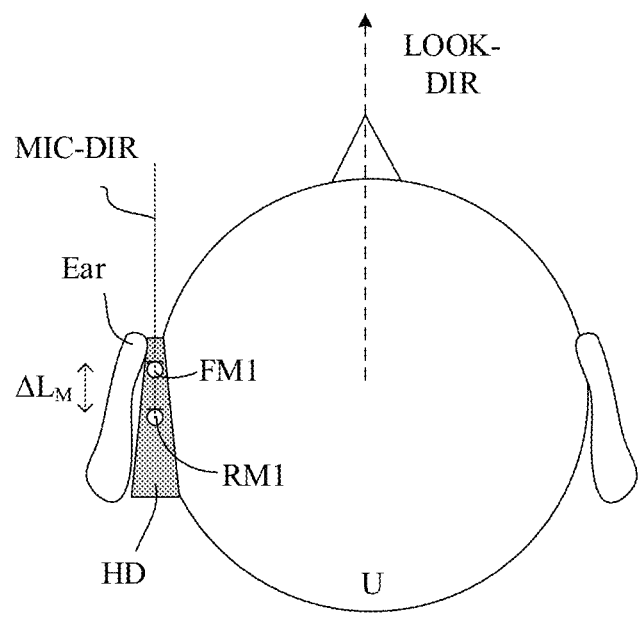
FIG. 1A illustrates a use case of an embodiment of a (single, monaural) hearing device according to the present disclosure.
Figure 1B:
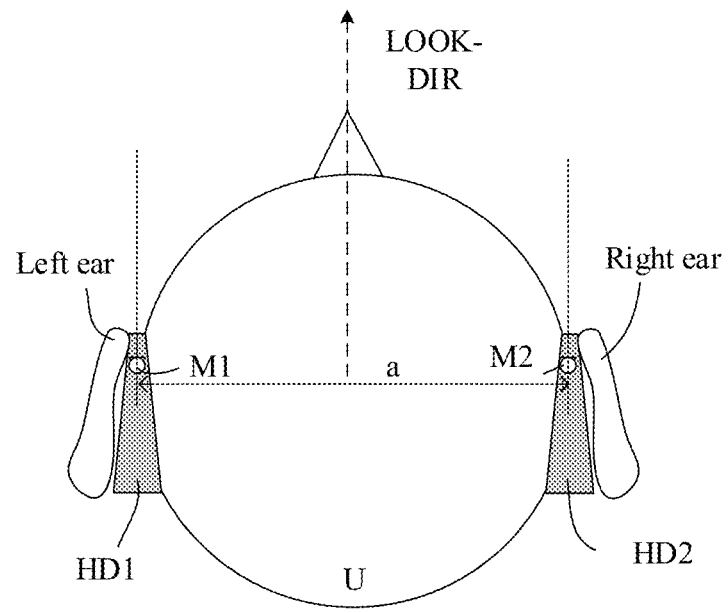
FIG. 1B illustrates a use case of a first embodiment of a binaural hearing system according to the present disclosure.
Figure 1C:
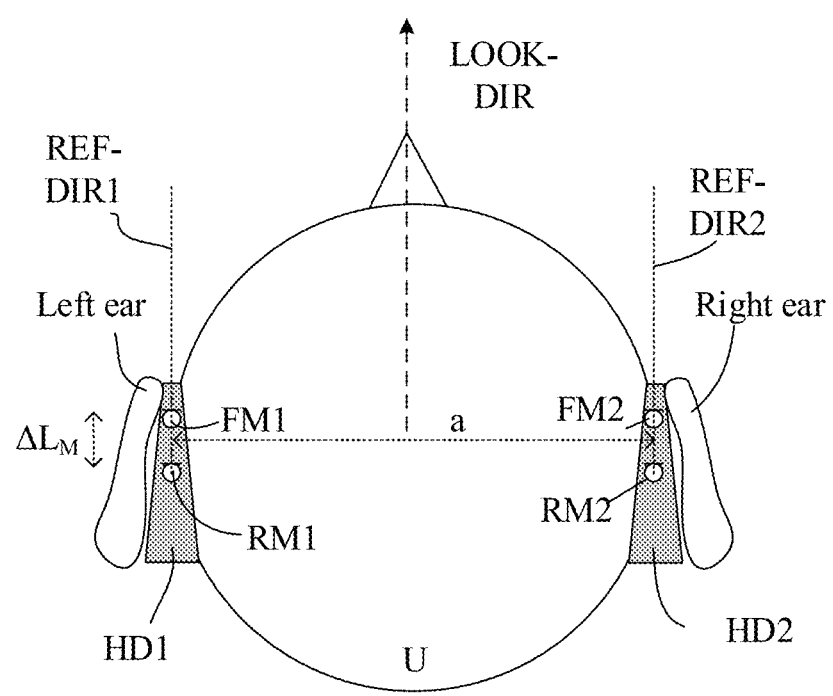
FIG. 1C illustrates a use case of a second embodiment of a binaural hearing system according to the present disclosure.

SPP Estimation:

We consider acoustic situations e.g. illustrated in FIG. 1A, 1B or 1C. Specifically, we consider a user of a hearing assistive device or system—the hearing assistive device or system has access to a total of M≥2 microphones, which are typically located at/in the ears of a user, and which may be organized in a monaural (at one ear) or binaural (at both ears) configuration.

FIG. 1A illustrates a use case of an embodiment of a (single, monaural) hearing device according to the present disclosure. A user (U) wears a single (monaural) hearing device (HD) at a left ear (Ear). The hearing device comprises a BTT-part adapted for being located behind an ear of the user. The hearing device comprises first and second input transducers, here front and rear microphones (FM1, RM1) providing first and second electric input signals, respectively. The two microphones are distanced $\Delta L_M$ (e.g. ≈10 mm) apart and define a microphone axis (MIC-DIR).

The hearing device (HD) comprises a beamformer filtering unit allowing beamforming according to the present disclosure to be performed based on the first and second electric input signals, In the scenario of FIG. 1A, and 1C, the microphone axis of the individual hearing devices (HD1 in FIG. 1A and HD1, HD2 in FIG. 1C) is parallel to a look direction (LOOK-DIR) defined by the nose of the user. This is achieved by mounting the hearing device(s) as illustrated, so that the body of the BTE-part (and hence the microphone axis) is substantially parallel to a front direction of the user.

FIG. 1B illustrates a use case of a first embodiment of a binaural hearing system according to the present disclosure. A user (U) wears first and second hearing devices (HD1, HD2) at a left ear (Left ear) and a right ear (Right ear), respectively. The two hearing devices each comprises a BTE-part adapted for being located behind an ear of the user. Each of the first and second hearing devices (HD1, HD2) is shown to contain a single microphone (M1, M2, respectively). The microphones of the first and second hearing devices provide first and second electric input signals, respectively. The two microphones are in this embodiment located a distance α (roughly equal to a head diameter, e.g. 200 mm) apart. The 'microphone axis (in case the two microphone signals are processed together) is perpendicular to the look direction (LOOK-DIR) of the user (U). The first and second hearing devices (HD1, HD2) each comprises antenna and transceiver circuitry allowing the two hearing devices to exchange the respective microphone signals, or to forward their microphone signal (in full or in part) to a processing device (e.g. a remote control or a smartphone, or one of the hearing devices). The hearing system (e.g. one of, or each of, the hearing devices (or a separate processing device) comprises a beamformer filtering unit allowing beamforming according to the present disclosure to be performed based on the first and second electric input signals.

FIG. 1C illustrates a use case of a second embodiment of a binaural hearing system according to the present disclosure. A user (U) wears first and second hearing devices (HD1, HD2) at a left ear (Left ear) and a right ear (Right ear), respectively, as described in connection with FIG. 1B. The two hearing devices each comprises a BTE-part adapted for being located behind an ear of the user. In the embodiment of FIG. 1C, however, each of the first and second hearing devices (HD1, HD2) comprises two microphones (FM1, RM1) and (FM2, RM2), respectively, as discussed in connection with FIG. 1A. Each of the two pairs of microphones provide first and second electric input signals, respectively. The hearing system (e.g. one of, or each of, the hearing devices (or a separate processing device) comprises a beamformer filtering unit allowing beamforming according to the present disclosure to be performed based on at least two of the microphones of the two sets of first and second electric input signals of the first and second hearing devices. In an embodiment, each of the first and second hearing devices comprises a beamformer filtering unit providing beamforming, e.g. including estimation of speech presence probability and providing a resulting beamformed signal, according to the present disclosure, The beamforming may e.g. be based on the locally generated first and second electric input signals or based on one or both locally generated electric input signal and one or both electric input signal from the opposite hearing device (or parts thereof, e.g. selected frequency ranges/bands). The microphone directions of the 'local' microphone systems of the respective first and second hearing devices (HD1, HD2) are indicated in FIG. 1C (denoted REF-DIR1 and REF-DIR2, respectively). An advantage of using microphones from both hearing devices is that a resulting beamformer can be more advanced (include more lobes of high sensitivity and/or more minima in its angular sensitivity (polar plot)).

In the embodiments of FIG. 1A, 1B, 1C, the hearing device(s) are shown to comprise a 'behind the ear' (BTE) part wherein the microphone(s) is(are) located. Other styles of hearing devices comprising parts adapted for being located elsewhere on the head of the user (e.g. in or around ears of the user) may be applied, while still advantageously providing estimation of speech presence probability and possibly providing a resulting beamformed signal according to the present disclosure.

A. Signal Model

We assume that the signal $x_m(n)$ received at microphone m consists of a clean signal $s_m(n)$ and an additive noise component $v_m(n)$, $$x_m(n) = s_m(n) + v_m(n); \; m=1, \ldots, M. \qquad (1)$$

Each microphone signal is passed through an analysis filter bank, leading to the time-frequency representation, $$X_m(k,l) = S_m(k,l) + V_m(k,l), \; m=1, \ldots, M, \qquad (2)$$

where k and l denote a frequency and a time index, respectively. Generally, $X_m(k,l)$, $S_m(k,l)$, $V_m(k,l) \in \mathbb{C}$, i.e. they are complex-valued. Stacking microphone signals for a particular (k l) pair in a vector, we arrive at $$X(k,l) = S(k,l) + V(k,l), \qquad (3)$$

where $X(k,l) = [X_1(k;l) \ldots X_M(k,l)]^T$ is an M×1 vector, superscript $^T$ denotes transposition, and where vectors S(k,l) and V(k,l) are defined similarly.

B. Spatial Decomposition

Figure 2:
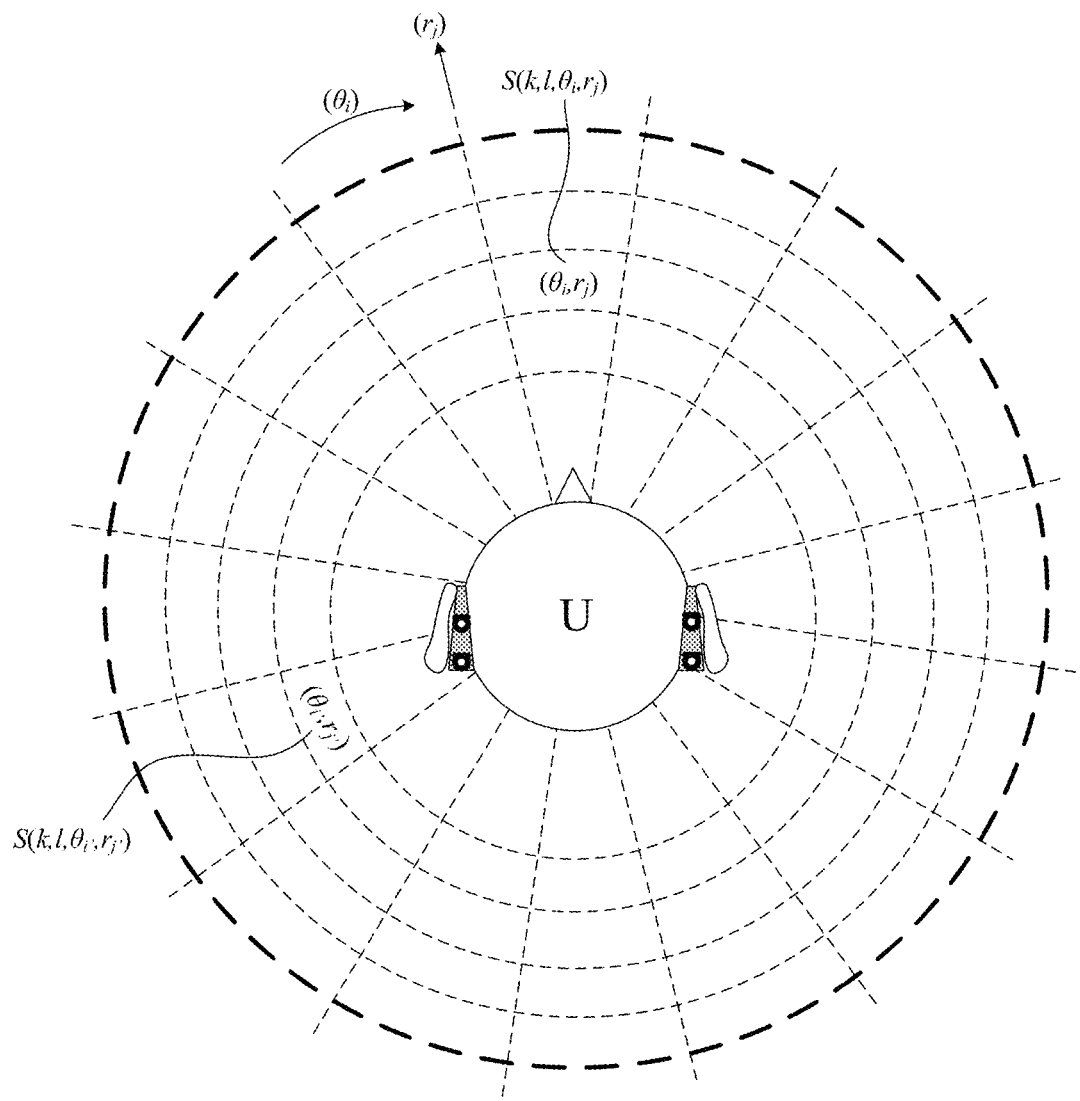
FIG. 2 shows for a particular time instant/and a particular frequency index k, space is divided into cells parameterized by the angle θ and distance r to the center of the cell, with respect to the center of the users' head.

We will be interested in the spatial origin of the clean and noisy signals. Hence, we divide space into segments, e.g., cells, as shown in FIG. 2. All parameters (k,l,θ,r) are discrete-valued. In particular, for a given frequency k and time instant l, space is divided into cells parameterized by (θ,r). The pair (θ,r) represents the distance and angle of a spatial cell, respectively, with respect to the center of the users' head, and are selected from a discrete set $\{\theta_i, r_j\}$, i=1, ..., T, j=1, ..., R. We consider here a 2-dimensional representation of space for simplicity—extension to a 3-dimensional description is straightforward.

To perform this spatial decomposition of the clean and noisy signals, we use spatial filters (beamformers). Specifically, to decompose the clean signal into spatial cells S(k,l,θ; r), beamformers are applied to the clean microphone signal vector S(k,l) (this is e.g. done in an off-line training phase, where the clean signal is accessible, see below for details). For example, S(k,l,θ; r) may be computed as $$S(k,l,\theta; r) = W_S^H(k,\theta,r) S(k,l) \quad (4)$$

where $W_S(k,\theta,r) \in \mathbb{C}^M$ is a beamformer weight vector, given by $$W_S(k,\theta,r) = d(k,\theta,r)/(d^H(k,\theta,r) d(k,\theta,r)) \quad (5)$$

where $d(k,\theta,r) \in \mathbb{C}^M$ is the acoustic transfer function vector whose entries are acoustic transfer functions from the spatial position (r,θ) to each microphone, and where superscript $^H$ denotes vector transposition and complex conjugation (Hermitian transposition). Note that this beamformer is time-invariant (independent of l).

To compute X(k,l,θ,r) from the noisy microphone signals, a minimum variance distortion-less response (MVDR) beamformer, $W_X(k,l,\theta,d)$, may, for example, he applied to the noisy microphone signal vector X(k,l).

$$X(k, l, \theta, r) = W_X^H(k, l, \theta, r) X(k,l) \quad (6)$$

where $$W_X(k, l, \theta, r) = \frac{C_X^{-1}(k, l) d(k, \theta, r)}{d^H(k, \theta, r) C_X^{-1}(k, l) d(k, \theta, r)} \quad (7)$$

and where $C_X \triangleq E[X(k,l)X^H(k,l)]$ is the cross-power spectral density matrix of the noisy signal, which can readily be estimated from the noisy microphone signals. Other beamformers could be used here, e.g., $W_S(k,\theta,r)$ (Eq. (5)). The advantage of using the MVDR beamformer $W_X$ in Eq. (7), however, is that this beamformer preserves signal components from position (r,θ), perfectly, while suppressing maximally signal components from other directions (this reduces "leakage" of unwanted signal components into X(k,l,θ,r) and ensures an optimal estimate of the noisy signal component originating from position (r,θ)).

FIG. 2 schematically illustrates for a particular time instant l and a particular frequency index k, space around a user (U) is divided into cells $(\theta_i, r_j)$ parameterized by the angle θ and distance r (e.g. to the center of the cell), with respect to the center of the users' head. The user (U) wears an exemplary binaural hearing system comprising first and second hearing devices located at left and right ears of the user, as e.g. illustrated in FIG. 1C. Values $(S(k,l,\theta_i,r_j)$ and $S(k,l,\theta_i,r_{j'}))$ of a signal S in a specific frequency band (k) at a specific time (l) are indicated for two different spatial cells $(\theta_i, r_j)$ and $(\theta_i, r_{j'})$. In an embodiment, specific values of the signal is determined for a multitude of such as all cells of the space around the user. The space around the user may e.g. be limited to a certain distance, e.g. $r_j < r_{max}$, as e.g. indicated in FIG. 2 by the outer bold dashed circle. In an embodiment, space around a user having a radial valuer $r_j$ larger than a (e.g. predefined) threshold value $r_{th}$ is represented by a single cell for each specific angular value $\theta_i$, i.e. e.g. in the illustration of FIG. 2, each 'pie-slice' (represented by a specific value of θ) outside the bold dashed circle (in that case representing the threshold value $r_{th}$) only contains one cell. Likewise, the cells of the space around the user may be of equal or different size. In an embodiment, the cell size vary with radial distance ($r_j$) from and/or angle ($\theta_i$) around the user (U). The size of the cells may e.g. increase with increasing radial distance from the user. In an embodiment, the cell size is not uniform in an angular view, e.g., comprising smaller cells in front of the user than elsewhere. In an embodiment, the spatial segmentation is configurable, e.g. from a user interface, e.g. implemented in a remote control or as an APP of a smartphone or similar device (e.g. a tablet computer). The number of spatial segments in an angular direction around the user (each segment being defined by a specific value of $\theta_i$) is larger than or equal to two, e.g. larger than or equal to three, larger than or equal to four. The number of spatial segments in a radial direction around the user (each segment being defined by a specific value of $r_j$) is larger than or equal to one, e.g. larger than or equal to two, e.g. larger than or equal to three.

C. Speech Presence Probability (SPP) Estimation

For each spatial cell and for a particular time l and frequency k, we consider the following hypotheses:

$$H_0(k,l,\theta,r); S(k,l,\theta,r) = 0 \text{ (Speech is absent)} \quad (8)$$

$$H_1(k,l,\theta,r); S(k,l,\theta,r) \neq 0 \text{ (Speech is present)} \quad (9)$$

The SPP is defined as the probability that speech is present, i.e., $P(H_1)$.

In order to estimate $P(H_1)$, we define the following indicator function:

$$I(k, l, \theta, r) = \begin{cases} 1 & \text{if } S(k, l, \theta, r) \neq 0 \\ 0 & \text{if } S(k, l, \theta, r) = 0 \end{cases} \quad (10)$$

To estimate $P(H_1)$, we will be interested in finding an estimate $\hat{I}(k,l,\theta,r)$ of $I(k,l,\theta,r)$ based on the (generally) noisy microphone signals. In principle, the estimate could be based on the entire observable noisy signal. In practice, however, it is mainly the noisy signal in the spectral, temporal, and spatial "neighbourhood" of (k,l,θ,r) that carries information about the speech presence in frequency, time, space segment (e.g. cell) (k,l,θ,r). The term 'spectral neighbourhood' may e.g. include frequencies within +/−100 Hz of the frequency in question. The term 'temporal neighbourhood' may e.g, include time instances within +/−50 ms from the current time In an embodiment, the term 'spatial neighbourhood' may include space cells located within a radius of 0.4 in, such as within 0.25 m of (e.g. the centre of) the spatial cell in question. Hence, let Z(k,l,θ,r) denote the noisy information upon which estimate $\hat{I}(k,l,\theta,r)$ is based.

Consider next the minimum mean-square estimator $\hat{I}^*(k,l,\theta,r)$ of I(k,l,θ,r):

$$\hat{I}^* = \operatorname*{argmin}_{\hat{I}} E\{(I - \hat{I})^2 | Z\} \quad (11)$$

where we dropped the parameter dependencies for notational convenience. Then it can be shown (details omitted) that the SPP is simply equal to $\hat{I}^*$:

$$P(H_1(k,l,\theta,r)) = \hat{I}^*(k,l,\theta,r) \quad (12)$$

Hence, in order to find the SPP, we need to find the minimum mean-square error (MMSE) estimator $\hat{I}^*(k,l,\theta,r)$ of I(k,l,θ,r). In the following, we describe a procedure to find this estimate, using supervised learning—in our example, we use deep neural networks (DNN), but other algorithmic structures could be used (e.g., estimators based on Gaussian Mixture Models, Hidden Markov Models, Support Vector Machines, etc.).

Training: Finding the Parameters of a DNN MMSE Estimator

For a given noisy microphone signal, X(k,l), we wish to compute the speech presence probability $P(H_1(k,l,\theta_i,r_j))$, $i=1, \ldots, T$, $j=1, \ldots, R$. From Eq. (12) it follows that this is equivalent to computing the MMSE estimates $\hat{I}^*(k,l,\theta,r)$ $i=1, \ldots, T$, $j=1, \ldots, R$. We propose to find these MMSE estimates using deep neural networks (DNN) whose parameters are found in an offline supervised learning procedure. The procedure requires access to a (large) set of training signals, i.e., examples of noisy microphone signals X(k,l) and corresponding binary speech presence variables $I(k,l,\theta,r)$. In the following, an example of how this training data is constructed will be illustrated.

A. Generating Clean and Noisy Microphone Signals for Training

Clean and noisy microphone signals are generated (or recorded) which vary in 1) the target speech source (different talkers, different speech signals for each talker),
2) target spatial position $(\theta_i,r_j)$, e.g. by generating clean microphone signals by convolving the speech signals from the point above with impulse responses from various spatial positions to microphones located on/at the ears of various persons.
3) the additive noise type (e.g., cocktail party noise, car cabin noise, competing speakers, other environmental noise, etc.),
4) the signal-to-noise ratio (SNR) at which the target signal is typically observed in practice, in the application at hand (e.g., −15 dB≤SNR≤25 dB, or −10 dB≤SNR≤30 dB),
5) head size,
6) microphone variation.

A large corpus of microphone signals is generated by combining the factors described above: common to the used combinations is that they represent noisy signals, which could be typically be experienced in a real-life situation. Hence, if prior knowledge of any of these factors is available, then the noisy signals used for training should reflect this knowledge. If, for example, the identity of the target talker is known, then only speech signal from this particular individual should be used in point 1). Similarly, if it is known that a particular noise type is to be expected (e.g. car cabin noise in a car application), then the noise used to generate the noisy microphone signals (point 3 above) should be dominated by car noise, Advantageously, the data (microphone signals) are recorded with a hearing device or a pair of hearing devices as in the intended use case (e.g. same style, same number and location of microphones relative to the user, etc.). In an embodiment, at least some of the data are gathered by the user himself while wearing a hearing device or a pair of hearing devices fitted to him and identical or similar to the one where the date is intended to be used.

B. Finding Training Pairs $I(k,l,\theta,r)$ and X(k,l)

Figure 3:
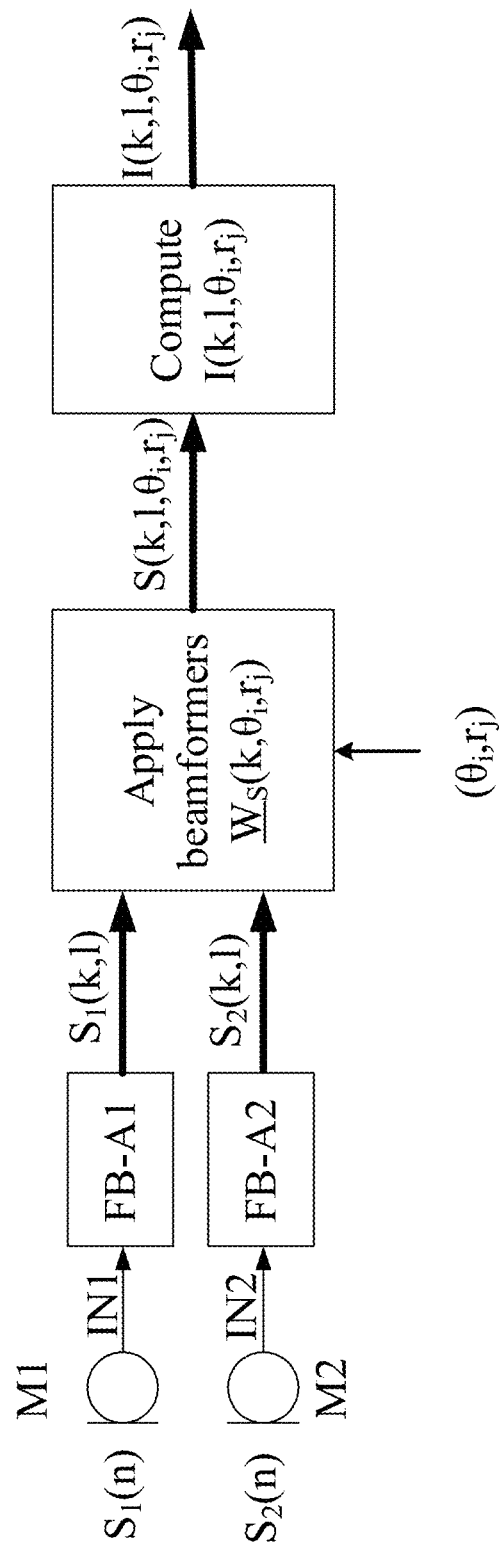
FIG. 3 shows all exemplary block diagram for determining 'ground truth' binary speech presence indicator functions $I(k,l,\theta,r)$ from clean microphone target signals $s_1(n), \ldots, s_M(n)$, here M=2.

From the clean target-signals generated above (i.e., Points 1 and 2), the binary speech presence indicator function $I(k,l,\theta,r)$ is computed. The procedure is illustrated in FIG. 3: a particular clean training signal (Point 1 above) from a particular target location $(\theta',r')$ (Point 2 above) is passed through analysis filter banks, leading to signals $S_m(k,l)$, $m=1, \ldots, M$. The filterbank signals are then passed through beamformers (e.g. Eq. (5)) steered towards locations $\{\theta_i,r_j\}$ $i=1, \ldots, T; j=1, \ldots, R$, resulting in signals (as functions of k and l, i.e. "spectrograms") $S(k,l,\theta_i,r_j)$ for each $i=1, \ldots, T; j=1, \ldots, R$. The ground-truth indicator function $I(k,l,\theta_i,r_j)$ is computed by deciding if the resulting $S(k,l,\theta_i,r_j)$ is significantly different from 0. In practice, this may be done by comparing the signal-energy in cell $S(k,l,\theta_i,r_j)$ with a small threshold $\epsilon>0$:

$$I(k,l,\theta,r) = \begin{cases} 1 & \text{if } |S(k,l,\theta,r)|^2 > \epsilon \\ 0 & \text{otherwise} \end{cases} \quad (13)$$

FIG. 3 shows an exemplary block diagram for determining 'ground truth' binary speech presence indicator functions $I(k,l,\theta,r)$ from clean microphone target signals $s_1(n), \ldots, s_M(n)$, here M=2.

In order to train DNNs, the ground-truth binary speech presence indicator functions (Eq. (13)) are stored together with noisy versions (Points 3 and 4, above) of the particular underlying clean training signal (Points 1 and 2, above) that gave rise to the speech presence indicator function in question.

The result of this procedure is a (large) collection of pairs of indicator functions $I(k,l,\theta,r)$ and noisy signals X(k,l), for which the underlying clean signal gave rise to exactly that indicator function.

C. Training DNN MMSE Estimators

Figure 4:
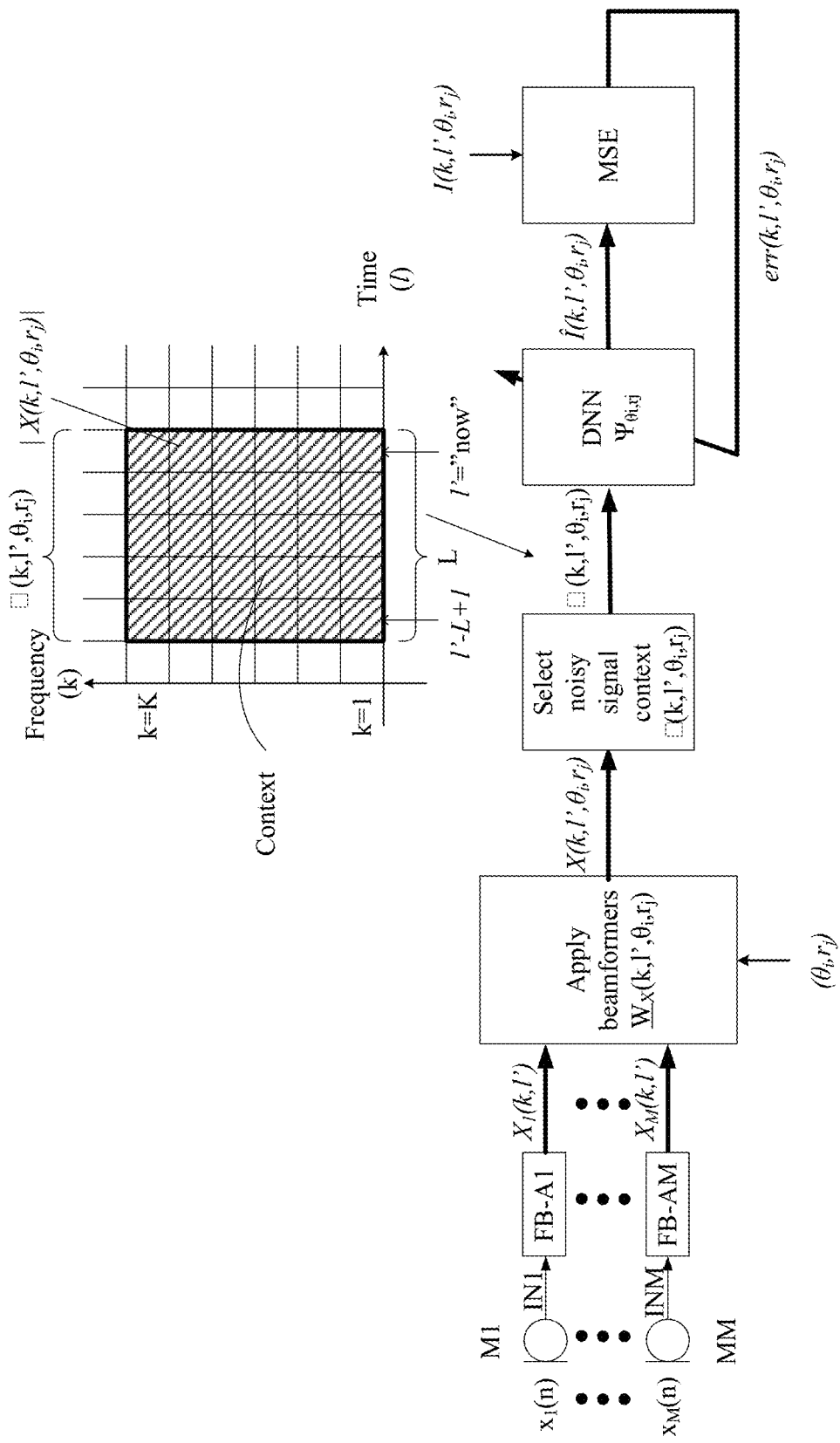
FIG. 4 illustrates an exemplary block diagram for training of DNN $\Psi_{\theta_i,r_j}$ for estimating the speech presence probability for a particular spatial cell $(\theta_i, r_j)$.

FIG. 4 shows an exemplary block diagram for training of an algorithm, e.g. a neural network, such as a deep neural network DNN $\Psi_{\theta_i,rj}$ for estimating the speech presence probability for a particular spatial cell $(\theta_i,r_j)$. The trained DNN is represented by the parameter set $\Psi^*_{\theta_i,rj}$ (see FIG. 5). The process is repeated to train independent DNNs $\Psi^*_{\theta_i,rj}$ for each spatial cell $(\theta_i,r_j)$. The circuit for training the neural network DNN $\Psi_{\theta_i,rj}$ comprises a multitude M of microphones M1, ..., MM (M≥2) for capturing environment sound signals $x_1(n), \ldots, x_M(n)$, n denoting time, and providing respective (e.g. analogue or digitized) electric input signals IN1, ..., INM. Each of the microphone paths comprises an analysis filter bank FB-A1, ..., FB-AM, respectively, for (possibly digitizing and) converting respective time domain electric input signals IN1, ..., INM to corresponding electric input signals $X_1(k,l'), \ldots, X_M(k,l')$ in a time frequency representation, where k and l' are frequency and time (frame) indices, respectively. The electric input signals $X_1(k,l'), \ldots, X_M(k,l')$ are fed to beamformer $W_X(k,l',\theta_i,r_j)$, and processed as described in the following.

The set of pairs of indicator functions $I(k,l,\theta,r)$ and corresponding noisy signals X(k,l) are used to train DNN-based MMSE estimators of $I(k,l,\theta,r)$. The training procedure is illustrated in FIG. 4. A noisy training signal (M microphone signals) is passed through analysis filter banks, resulting in signals $X_1(k,l), \ldots, X_M(k,l)$. For a particular time instant l', the noisy signals are passed through beamformers $W_X(k,l',\theta_i,r_j)$ steered towards a particular spatial cell $(\theta_i,r_j)$ (cf. Eq. (7) and FIG. 2), for each frequency index $k=1, \ldots, K$. The resulting signal is $X(k,l',\theta_i,r_j)$, which represents the part of the noisy signal originating from spatial cell $(\theta_i,r_j)$. Next, values of $X(k,l,\theta_i,r_j)$ are chosen, which are used to estimate $I(k,l,\theta_i,r_j)$. In particular, for a given time instant l=l', the values $I(k,l',\theta_i,r_j)$, $k=1, \ldots, K$ could be estimated using present and past noisy signal values, $X(k,l'',\theta_i,r_j)$, $k=1, \ldots, K$; $l''=l'-L+1, \ldots, l'$, where L denotes the number of past frames used to estimate $I(k,l,\theta_i,r_j)$. The number L of frames represents the 'history' of the signal that is included in the estimation of speech presence probability. With a view to the general nature of speech, the 'history' (L) may include up to 50 ms of the input signal, or up to 100 ms, or more, of the input signal.

This set of past and present values of $X(k,l,\theta_i,r_j)$ (denoted $\mathcal{Z}(k,l',\theta_i,r_j)$, and provided by unit 'Select noisy signal context $\mathcal{Z}(k,l',\theta_i,r_j)$' in FIG. 4, 5) serve as input to a (e.g. deep) neural network. In particular, the input of the DNN has a dimension corresponding to the cardinality of this set. The input to the DNN may be the (generally complex-valued) spectral values $X(k,l,\theta_i,r_j)$, the magnitude spectral values $|X(k,l,\theta_i,r_j)|$ (as exemplified in FIG. 4, 5), the log-magnitude values log $|X(k,l,\theta_i,r_j)|$, the (generally complex-valued) cepstra computed by Fourier-transforming the log-magnitude-values (cf. e.g. [3]), or the magnitude value of the complex-valued cepstra Other functions applied to the input set are obviously possible. In the time-frequency map insert in the top part of FIGS. 4 (and 5), the frequency range represented by indices k=1, ..., K may be the full operational range of the hearing device in question (e.g. representing a frequency range between 0 and 12 kHz (or more)), or it may represent a more limited sub-band range (e.g. where speech elements are expected to be located, denoted 'speech frequencies', e.g. between 0.5 kHz and 8 kHz, or between 1 kHz and 4 kHz). A limited 'noisy signal context $\mathcal{Z}(k,l',\theta_i,r_j)$' comprising a subset of frequency bands may be represented by $k_{min}$ and $k_{max}$, if indices k=1, ..., K represent the full frequency range of the device, The 'noisy signal context' may contain a continuous range or selected sub-ranges between $k_{min}$ and $k_{max}$.

Noisy input sets $\mathcal{Z}(k,l',\theta_i,r_j)$, e.g., comprising $|X(k,l'',\theta_i,r_j)|$, k=1, ..., K; l''=l'−L+1, ..., l', $|X|$ representing magnitude of X, and corresponding groundtruth binary speech presence functions $I(k,l',\theta_i,r_j)$, k=1, ..., K (e.g. evaluated for all l' (i.e, slided through time, while for each value of l' considering a 'history' of L time frames of noisy input signals X or $|X|$)) are used to train a (deep) neural network. Using the neural network, we wish to estimate $I(k,l',\theta_i,r_j)$, k−1, ..., K for time 'now' (=l'), based on L observations up to (and including) time 'now' (see e.g. time-frequency map insert in FIG. 4, 5). The network parameters are collected in a set denoted by $\Psi_{\theta_i,r_j}$; typically, this parameter set encompasses weight and bias values associated with each network layer. The network may be a feedforward multi-layer perceptron. a convolutional network, a recurrent network, e.g., a long short-term memory (LSTM) network, or combinations of these networks. Other network structures are possible. The output layer of the network may hat e a logistic (e.g. sigmoid) output activation function to ensure that outputs are constrained to the range 0 to 1. The network parameters may be found using standard, iterative, steepest-descent methods, e.g., implemented using back-propagation (cf. e.g. [4]), minimizing the mean-squared error (cf. signal $err(k,l',\theta_i,r_j)$ between the network output $\hat{I}(k,l',\theta_i,r_j)$ and the ground truth $I(k,l',\theta_i,r_j)$. The mean-squared error is computed across many training pairs of the ground truth indicator functions $I(k,l,\theta_i,r_j)$ (for fixed i,j) and noisy signals X(k,l).

Figure 5:
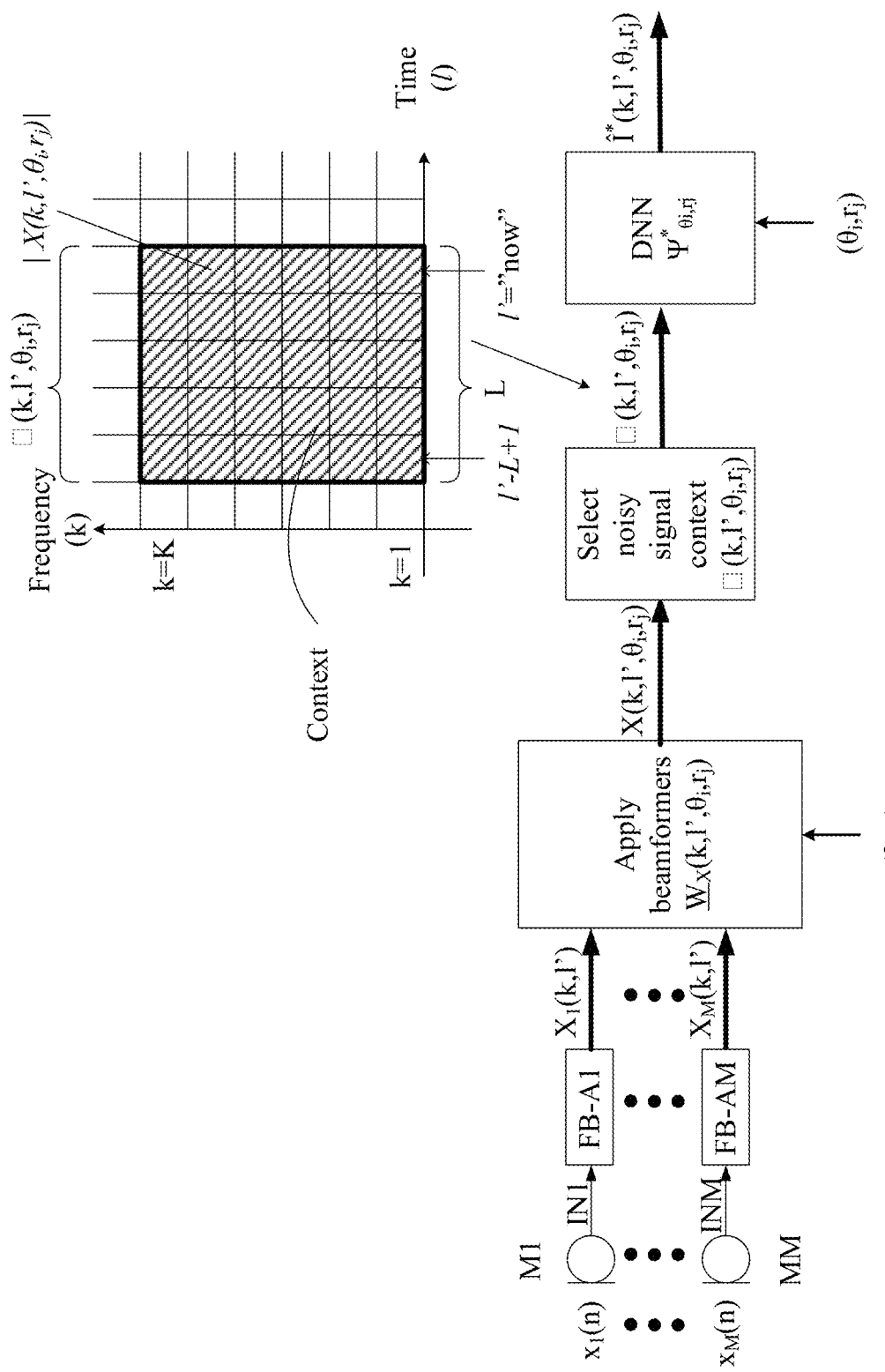
FIG. 5 shows an application of trained DNNs $\Psi^*_{\theta_i,r_j}$ to noisy microphone signals to produce speech presence probability estimates $\hat{I}^*(k,l,\theta_i,r_j)$.

The resulting network for signals captured from spatial cell $(\theta_i,r_j)$ is denoted $\Psi^*_{\theta_i,r_j}$ (cf. FIG. 5). Networks are trained for each spatial cell, $(\theta_i,r_j)$, i=1, ..., T, j=1, ..., R.

Application Of Trained DNNS For Speech Presence Probability Estimation

Once trained, the DNNs $\Psi^*_{\theta_i,r_j}$ are stored in memory (We use the superscript * to indicate that the networks are "optimal", i.e., have been trained). They are then applied to noisy microphone signals as outlined in FIG. 5.

FIG. 5 shows an application of trained DNNs $\Psi_{\theta_i,r_j}$ to noisy microphone signals to produce speech presence probability estimates $I(k,l,\theta_i,r_j)$. A number of T×R DNNs are evaluated for i=1, ..., T, j=1, ..., R to produce speech presence probabilities $P(H_1(k,l,\theta_i,r_j))=I^*(k,l,\theta_i,r_j)$. The circuit for providing speech presence probability estimates $I(k,l,\theta_i,r_j)$ comprises (as FIG. 4) a multitude M of microphones M1, ..., MM (M≥2) for capturing environment sound signals $x_1(n), ..., x_M(n)$, n denoting time, and providing respective (e.g. analogue or digitized) electric input signals IN1, ..., INM. Each of the microphone paths comprises an analysis filter bank FB-A1, ..., FB-AM, respectively, for (possibly digitizing and) converting respective time domain electric input signals IN1, ..., INM to corresponding electric input signals $X_1(k,l'), ..., X_M(k,l')$ in a time frequency representation, where k and l' are frequency and time (frame) indices, respectively. The electric input signals $X_1(k,l'), ..., X_M(k,l')$ are fed to beamformer $W_X(k,l',\theta_i,r_j)$ (cf, block Apply beamformers $W_X(k,l',\theta_i,r_j)$ in FIG. 5) providing a beamformed signal $X(k,l',\theta_i,r_j)$ for each spatial segment $(\theta_i,r_j)$. The beamformed signal $X(k,l',\theta_i,r_j)$ for a given spatial segment $(\theta_i,r_j)$ is fed to context unit $\mathcal{Z}(k,l',\theta_i,r_j)$ (cf. block Select noisy signal context $\mathcal{Z}(k,l',\theta_i,r_j)$ in FIG. 5) providing a current frame and a number of previous frames of the beamformed signal $X(k,l',\theta_i,r_j)$ for a given spatial segment $(\theta_i,r_j)$ as signal $\mathcal{Z}(k,l',\theta_i,r_j)$ to the optimized neural network DNN $\Psi^*_{\theta_i,r_j}$ (cf e.g. FIG. 7) providing the estimated speech presence probability estimates $I^*(k,l,\theta_i,r_j)$ for each spatial segment $(\theta_i,r_j)$ at the frequency k and time l'.

The use cases for the resulting speech presence probabilities $I^*(k,l',\theta_i,r_j)$ are numerous. For example, they may be used for voice activity detection, i.e. to decide that speech is present if $I^*(k,l',\theta_i,r_j) > \delta_1$, and decide that speech is absent if $I^*(k,l',\theta_i,r_j) < \delta_2$, where $0 \leq \delta_2 \leq \delta_1 \leq 1$ are pre-determined parameters. In contrast to existing methods (cf. e.g. [1]), which make such decisions on a per-time-frequency-tile basis, the proposed method includes the spatial dimension in the decision.

Furthermore, if speech has been determined to be present at a particular time instant l and frequency k, the physical location of the speech source may be determined, e.g., by identifying the spatial cell i=1, ..., T, j=1, ..., R with the highest speech presence probability (other ways of making this decision exist). This information is useful because beamformers may then be constructed (e.g., MVDR beamformers as outlined in Eq. (7)), which extract the signal originating from this particular spatial location, while suppressing maximally signals originating from other locations. Alternatively, beamformers may be constructed, which are a linear combination of beamformers directed at each spatial cell $(\theta_i,r_j)$, where the coefficients of the linear combination are derived from the speech presence probabilities [5], cf. e.g. FIG. 9. Further, other beamformers may be constructed, based on non-linear combinations.

The exposition above has focused on a 2-dimensional spatial decomposition (i.e., in spatial cells, $(\theta_i,r_j)$) involving acoustic transfer functions $d(k,\theta_i,r_j)$ (cf. Eq. (7)). It is often advantageous to use relative acoustic transfer functions $$d'(k,\theta_i) = d(k,\theta_i,r_j)/d_0(k,\theta_i,r_j)$$

where $d_0(k,\theta_i,r_j) \in \mathbb{C}$ is the acoustic transfer function from spatial position $(\theta_i,r_j)$ to a pre-chosen reference microphone. Relative transfer functions are essentially independent of source distance (hence, the dependence on distance $r_j$ has been suppressed in the notation). Substituting relative acoustic transfer functions d' for absolute acoustic transfer functions d everywhere in the exposition, allows us to decompose space in "pie slices" (FIG. 6), and to evaluate speech presence probabilities for each pie slice (i.e., for each direction).

Figure 6:
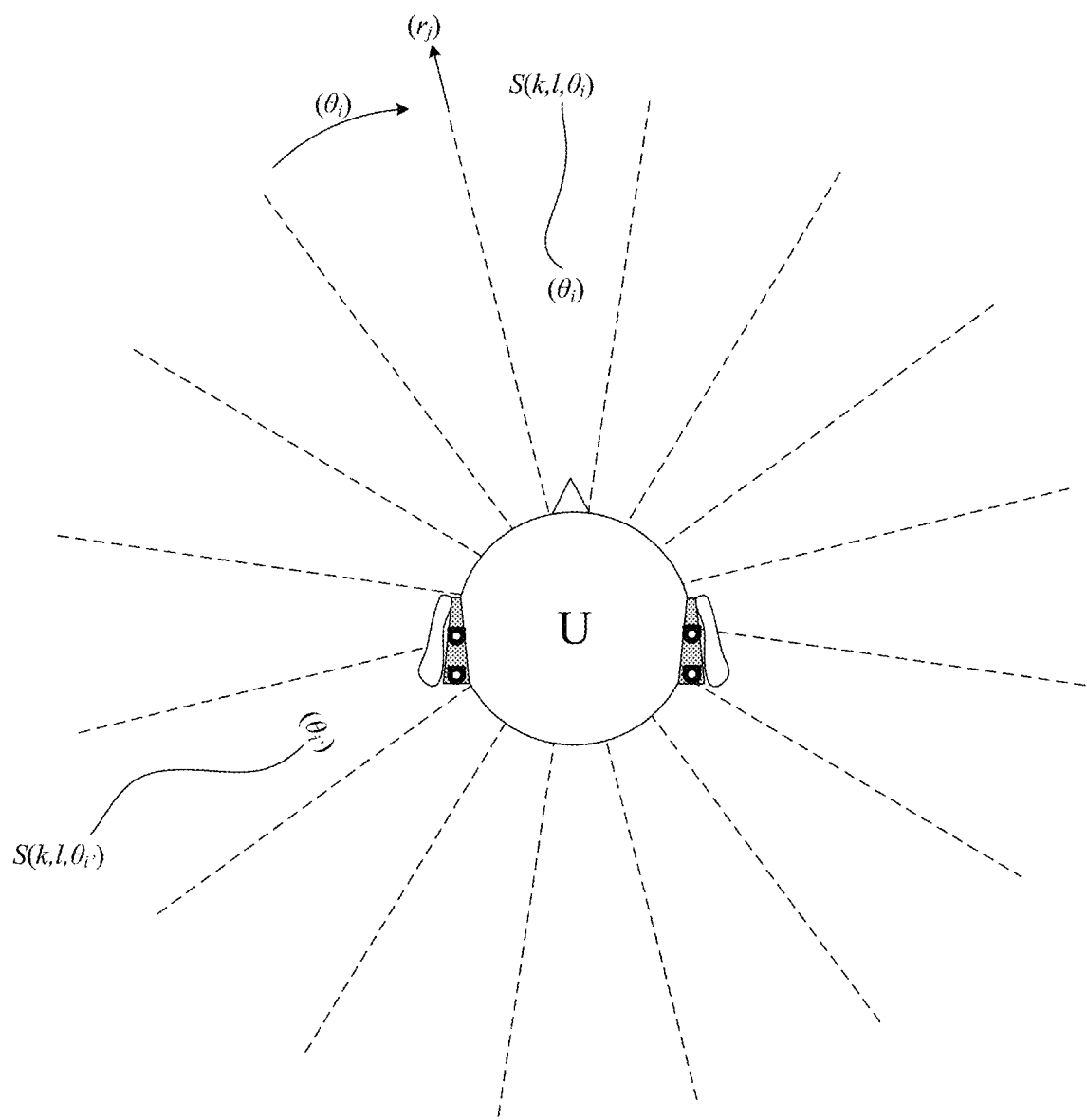
FIG. 6 shows an exemplary spatial decomposition using relative acoustic transfer functions rather than acoustic transfer functions results in a "pie slice" de-composition (cf.

We would then train DNNs, $\Psi^*_{\theta_i}$, i-1, ..., T, which are dedicated to spatial directions (pie slices), rather than spatial cells. The usage of the resulting speech presence probabilities is completely analogous to the situation described above, where speech presence probabilities were estimated for spatial cells. The advantage of this solution is that fewer DNNs need to be trained, stored, and executed, because they are no longer dependent on hypothesized source distance FIG. 6 shows an exemplary spatial decomposition using relative acoustic transfer functions rather than acoustic transfer functions results in a "pie slice" de-composition of space around a user (compared to the cell based de-composition in cf. FIG. 2). The spatial segmentation in FIG. 6 is equivalent to the spatial segmentation in FIG. 2, apart from the lack of radial partition in FIG. 6. As in FIG. 2, the user (U) wears an exemplary binaural hearing system comprising first and second hearing devices located at left and right ears of the user, as e.g. illustrated in FIG. 1C. Values ($S(k,l,\theta_i)$ and $S(k,l,\theta_{i'})$) of a signal S in a specific frequency band (k) at a specific time (l) are indicated for two different spatial segments corresponding to angular parameters $\theta_i$ and $\theta_{i'}$, respectively. In an embodiment, specific values of the signal S is determined for a multitude of, such as all, segments of the space around the user. The number of segments are preferably larger than or equal to three, such as larger than or equal to four. The segments may represent a uniform angular division of space around the user, but may alternatively represent different angular ranges, e.g. a predetermined configuration, e.g. comprising a left and a right quarter-plane in front of the user and a half-plane to the rear of the user. The segments (or cells of FIG. 2) may be dynamically determined, e.g. in dependence of a current distribution of sound sources (target and/or noise sound sources).

Figure 7:
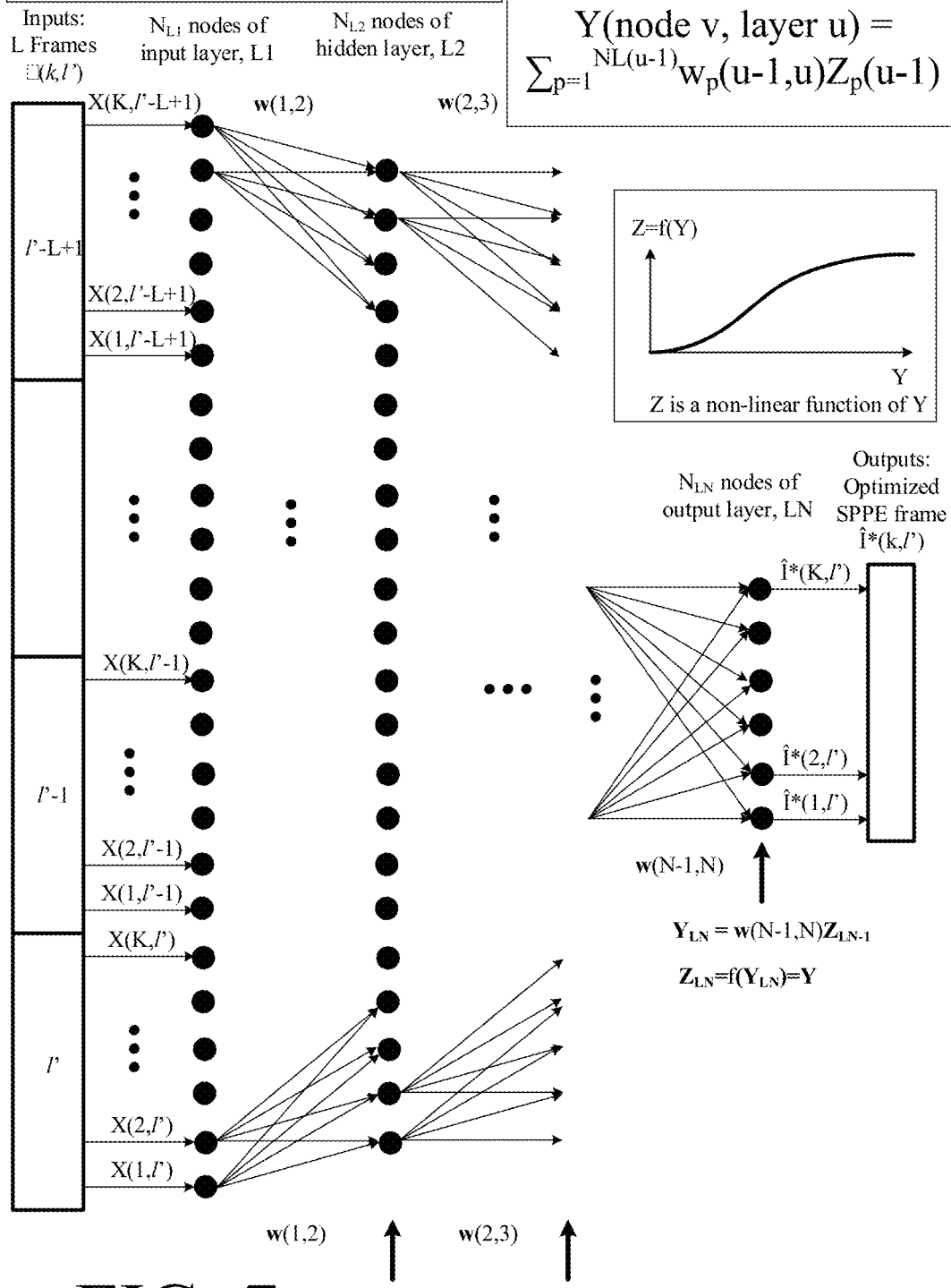

FIG. 7 shows schematically illustrates a neural network for determining speech presence probability estimator (SPPE) $\hat{I}^*(k,l,\theta i,rj)$ from a noisy input signal in a time-frequency representation.

FIG. 7 schematically illustrates a neural network for determining an output signal (for a given spatial segment $(\theta_i, r_j)$) in the form of a speech presence probability estimator $\hat{I}^*(k,l')$ from a number (L) of time frames of the noisy input signal $X(k,l')$ in a time-frequency representation. A present time frame (l') and a number L−1 of preceding time frames are stacked to a vector and used as input layer in a neural network (together denoted $\mathbb{Z}(k,l')$, cf. also insert denoted 'Context' in the upper part of FIG. 4 (and FIG. 5)). Each frame comprises K (e.g. K=64 or K=128) values of a (noisy) electric input signal, e.g. $X(k,l')$, k=1, ..., K in FIGS. 4, 5. The signal may be represented by its magnitude $|X(k,l')|$ (e.g, by ignoring its phase $\varphi$). An appropriate number of time frames is related to the correlation inherent in speech. In an embodiment, the number L−1 of previous time frames which are considered together with the present one may e.g. correspond to a time segment of duration of more than 20 ms, e.g. more than 50 ms, such as more than 100 ms. In an embodiment, the number of time frames considered (=L) are larger than or equal to 4, e.g. larger than or equal to 10, such as larger than or equal to 24. The width of the neural network is in the present application equal to K·L, which for K=64 and L−1=9 amounts to $N_{L1}$=640 nodes of the input layer L1 (representing a time segment of the audio input signal of 32 ms (for a sampling frequency of 20 kHz and a number of samples per frame of 64 and assuming non-overlapping time frames)). The number of nodes ($N_{L2}$, ..., $N_{LN}$) in subsequent layers (L2, ..., LN) may be larger or smaller than the number of nodes $N_{L1}$ of the input layer L1, and in general adapted to the application (in view of the available number of input data sets and the number of parameters to be estimated by the neural network). In the present case the number of nodes $N_{LN}$ in the output layer LN is K (e.g. 64) in that it comprises K time-frequency tiles of a frame of the probability estimator $\hat{I}^*(k,l')$.

FIG. 7 is intended to illustrate a general multi-layer neural network of any type, e.g. deep neural network, here embodied in a standard feed forward neural network. The depth of the neural network (the number of layers), denoted N in FIG. 7, may be any number and typically adapted to the application in question (e.g. limited by a size and/or power supply capacity of the device in question, e.g. a portable device, such as a hearing aid). In an embodiment, the number of layers in the neural network is larger than or equal to two or three. In an embodiment, the number of layers in the neural network is smaller than or equal to four or five.

The nodes of the neural network illustrated in FIG. 7 is intended to implement standard functions of neural network to multiply the values of branches from preceding nodes to the node in question with weights associated with the respective branches and to add the contributions together to a summed value $Y'_{v,u}$ for node v in layer u. The summed value $Y'_{v,u}$ is subsequently subject to a non-liner function f, providing a resulting value $Z_{uv}=f(Y'_{v,u})$ for node v in layer u. This value is fed to the next layer (u+1) via the branches connecting node v in layer u with the nodes of layer u+1. In FIG. 7 the summed value $Y'_{v,u}$ for node v in layer u (i.e. before the application of the non-linear (activation) function to provide the resulting value for node v of layer u) is expressed as:

$$Y'_{v,u} = \sum_{p=1}^{NL(u-1)} w_{p,v}(u-1, u) Z_p(u-1)$$

where $w_{p,v}(u-1,u)$ denotes the weight for node p in layer L(u−1) to be applied to the branch from node p in layer u−1 to node v in layer u, and $Z_p(u-1)$ is the signal value of the $p^{th}$ node in layer u−1. In an embodiment, the same activation function $f$ is used for all nodes (this may not necessarily be the case, though). An exemplary non-linear activation function Z=f(Y) is schematically illustrated in the insert in FIG. 7. Typical functions used in neural networks are the sigmoid function and the hyperbolic tangent function (tanh). Other functions may be used, though, as the case may be. Further, the activation function may be parametrized.

Together, the (possibly parameterized) activity function and the weights w of the different layers of the neural network constitute the parameters of the neural network. They represent the parameters that (together) are optimized in respective iterative procedures for the neural networks of the present disclosure. In an embodiment, the same activation function $f$ is used for all nodes (so in that case, the 'parameters of the neural network' are constituted by the weights of the layers).

The neural network of FIG. 7 may e.g. represent a neural network according to the present disclosure (cf. e.g. DNN, $\Psi^*_{\theta i r j}$ in FIG. 5).

Typically, the neural network according to the present disclosure is optimized (trained) in an offline procedure (e.g. as indicated in FIG. 4), e.g, using a model of the head and torso of a human being (e.g. Head and Torso Simulator (HATS) 4128C from Brüel & Kjær Sound & Vibration Measurement A/S). In an embodiment, data for training the neural network (possibly in an offline procedure) may be picked up and stored while the user wears the hearing device or hearing system, e.g. over a longer period of time, e.g. days, weeks or even months. Such data may e.g. be stored in an auxiliary device (e.g. a dedicated, e.g. portable storage device, or in a smartphone). This has the advantage that the training data are relevant for the user's normal behaviour and experience of acoustic environments.

Figure 8:
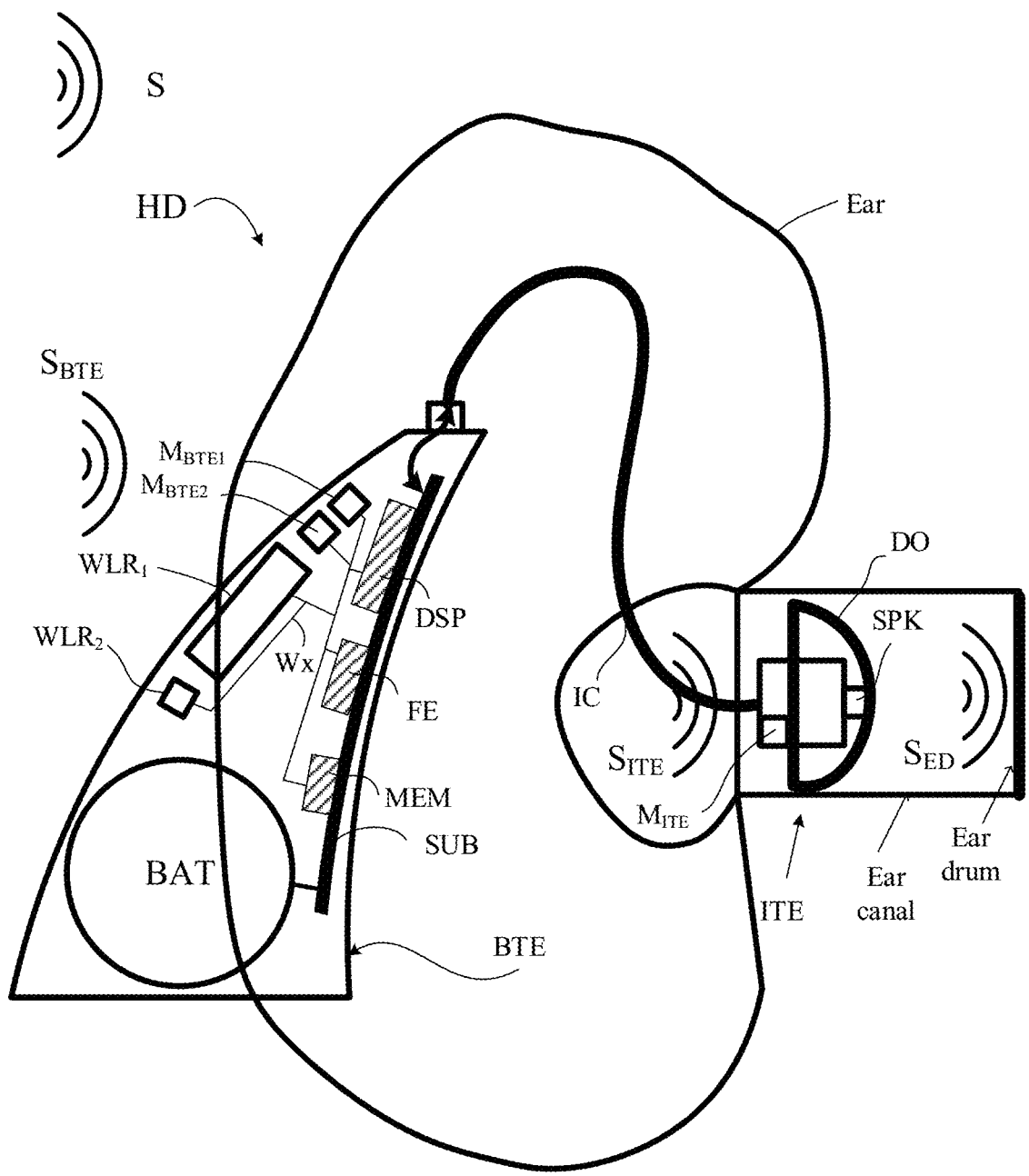
FIG. 8 shows a hearing device according to a first embodiment of the present disclosure.

FIG. 8 schematically shows an embodiment of a hearing device according to the present. disclosure. The hearing device (HD), e.g. a hearing aid, is of a particular style (sometimes termed receiver-in-the ear, or RITE, style) comprising a BTE-part (BTE) adapted for being located at or behind an ear of a user, and an ITE-part (ITE) adapted for being located in or at an ear canal of the user's ear and comprising a receiver (loudspeaker). The BTE-part and the ITE-part are connected (e.g. electrically connected) by a connecting element (IC) and internal wiring in the ITE- and BTE-parts (cf e.g. wiring $W_X$ in the BTE-part).

In the embodiment of a hearing device in FIG. 8, the BTE part comprises two input units comprising respective input transducers (e.g. microphones) ($M_{BTE1}$, $M_{BTE2}$), each for providing an electric input audio signal representative of an input sound signal ($S_{BTE}$) (originating from a sound field S around the hearing device). The input unit further comprises two wireless receivers ($WLR_1$, $WLR_2$) (or transceivers) for providing respective directly received auxiliary audio and/or control input signals (and/or allowing transmission of audio and/or control signals to other devices). The hearing device (HD) comprises a substrate (SUB) whereon a number of electronic components are mounted, including a memory (MEM) e.g. storing different hearing aid programs (e.g. parameter settings defining such programs, or parameters of algorithms, e.g. optimized parameters of a neural network) and/or hearing aid configurations, e.g. input source combinations ($M_{BTE1}$, $M_{BTE2}$, $WLR_1$, $WLR_2$), e.g. optimized for a number of different listening situations. The substrate further comprises a configurable signal processor (DSP, e.g. a digital signal processor, e.g. including a processor (e.g. PRO in FIG. 9) for applying a frequency and level dependent gain, providing feedback suppression and beamforming, filter bank functionality, and other digital functionality of a hearing device according to the present disclosure). The configurable signal processing unit (DSP) is adapted to access the memory (MEM) and for selecting and processing one or more of the electric input audio signals and/or one or more of the directly received auxiliary audio input signals, based on a currently selected (activated) hearing aid program/parameter setting (e.g. either automatically selected, e.g. based on one or more sensors and/or on inputs from a user interface). The mentioned functional units (as well as other components) may be partitioned in circuits and components according to the application in question (e.g. with a view to size, power consumption, analogue vs. digital processing, etc.), e.g. integrated in one or more integrated circuits, or as a combination of one or more integrated circuits and one or more separate electronic components (e.g. inductor, capacitor, etc.). The configurable signal processor (DSP) provides a processed audio signal, which is intended to be presented to a user. The substrate further comprises a front end IC (FE) for interfacing the configurable signal processor (DSP) to the input and output transducers, etc., and typically comprising interfaces between analogue and digital signals. The input and output transducers may be individual separate components, or integrated (e.g. MEMS-based) with other electronic circuitry.

The hearing device (HD) further comprises an output unit e.g. an output transducer) providing stimuli perceivable by the user as sound based on a processed audio signal from the processor or a signal derived therefrom. In the embodiment of a hearing device in FIG. 8, the ITE part comprises the output unit in the form of a loudspeaker (also termed a 'receiver') (SPK for converting an electric signal to an acoustic (air borne) signal, which (when the hearing device is mounted at an ear of the user) is directed towards the ear drum (Ear drum), where sound signal ($S_{ED}$) is provided. The ITE-part further comprises a guiding element, e.g. a dome, (DO) for guiding and positioning the ITE-part in the ear canal (Ear canal) of the user. The ITE-part further comprises a further input transducer, e.g. a microphone ($M_{ITE}$), for providing an electric input audio signal representative of an input sound signal ($S_{ITE}$).

The electric input signals (from input transducers $M_{BTE1}$, $M_{BTE2}$, $M_{ITE}$) may be processed according to the present disclosure in the time domain or in the (time-) frequency domain (or partly in the time domain and partly in the frequency domain as considered advantageous for the application in question).

The hearing device (HD) exemplified in FIG. 8 is a portable device and further comprises a battery (BAT), e.g. a rechargeable battery, e.g. based on Li-Ion battery technology, e.g. for energizing electronic components of the BTE- and possibly ITE-parts. In an embodiment, the hearing device, e.g. a hearing aid, is adapted to provide a frequency dependent gain and/or a level dependent compression and/or a transposition (with or without frequency compression) of one or more frequency ranges to one or more other frequency ranges, e.g. to compensate for a hearing impairment of a user.

Figure 9:
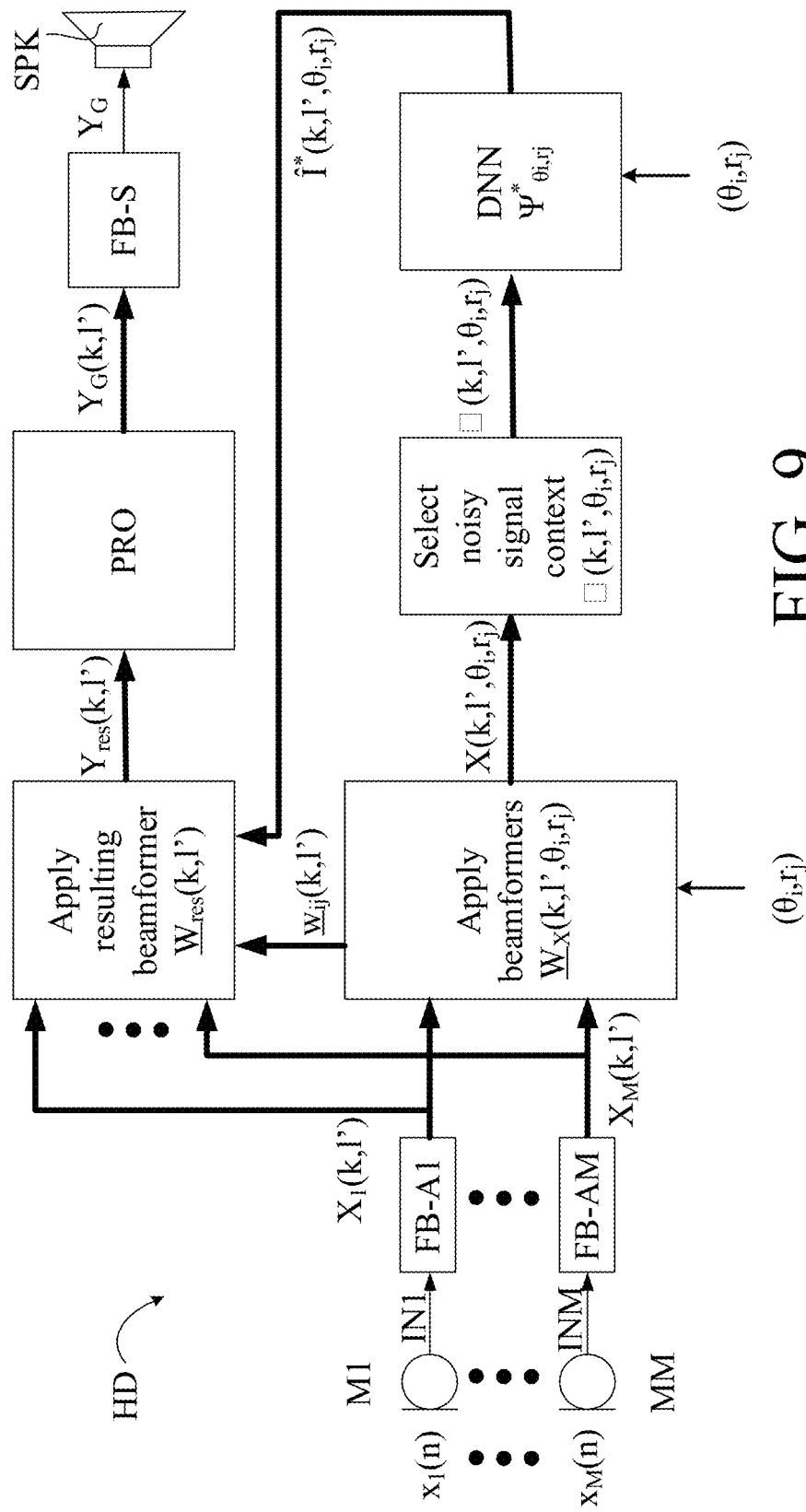
FIG. 9 shows a hearing device according to a second embodiment of the present disclosure.

FIG. 9 shows a hearing device (HD) according to a second embodiment of the present disclosure, The lower part of FIG. 9 comprises the same elements as the block diagram described in connection with FIG. 5. The microphones M1, . . . , MM, and the associated analysis filter banks FB-A1, . . . , FB-AM, together with the blocks of the upper part of FIG. 9 represent a forward path of the hearing device. The (noisy) electric input signals $X_1(k,l'), \ldots, X_M(k,l')$ in a time frequency representation are fed to resulting beamformer $W_{res}(k,l')$ (cf. block 'Apply resulting beamformer $W_{res}(k,l')$' in FIG. 9). The resulting beamformer $W_{res}(k,l')$ provides a resulting beamformed signal $Y_{res}(k,l')$, which is fed to processor (PRO) for further signal processing, e.g. for applying processing algorithms for compensation for a hearing impairment of the user (and/or for compensation of a difficult listening condition). The processor provides processed signal $Y_G(k,l')$, which is fed to synthesis filter bank FB-S for conversion to time-domain signal $Y_G$. The time-domain signal $Y_G$ is fed to output transducer (SPK) for conversion to an audible signal to be represented to the user.

The resulting beamformer $W_{res}(k,l')$ receives the electric input signals $X_i(k,l'), \ldots, X_M(k,l')$ in a time frequency representation. The resulting beamformer $W_{res}(k,l')$ further receives the estimated speech presence probabilities $\hat{I}^*(k,l', \theta_i, r_j)$ for each spatial segment $(\theta_i, r_j)$ from the optimized neural networks (DNN $\Psi^*_{\theta_i, rj}$). The resulting beamformer $W_{res}(k,l')$ receives in addition the beamformer weights $w_{ij}(k,l')$ for the beamformers providing beamformed signals $X(k,l', \theta_i, r_j)$ for the respective spatial segments $(\theta_i, r_j)$ from the beamformer filtering unit $W_X(k,l', \theta_i, r_j)$. The resulting beamformed signal $Y_{res}$ is given by the expression:

$$Y_{res}(k,l) = \underline{X}(k,l) \cdot \underline{w}_{res}(k,l)^T$$

where superscript $^T$ denotes transposition. The beamformed signal $Y_{res}$ is here determined as the linear combination $$Y_{res} = X_1 \cdot w_{1,res} + X_2 \cdot w_{2,res} + X_M w_{M,res},$$

where each of the M noisy electric input signals [$X_1$, $X_2$, ... $X_M$] and the coefficients [$w_{1,res}$, $w_{2,res}$, ..., $w_{M,res}$] (and hence the beamformed signal $Y_{res}$) are defined in a time frequency representation (k,l). The coefficients $\underline{w}_{res}(k,l)$ of the linear combination are given by the following expression:

$$\underline{w}_{wes}(k,l) = \Sigma_{i=1}^{T} \Sigma_{j=1}^{R} P_{ij}(k,l) \cdot \underline{w}_{ij}(k,l),$$

where k and l are frequency and time indices, respectively, T×R is the number of spatial segments (cf. e.g. FIG. 2), and $P_{ij}(k,l)$ are equal to the estimated speech presence probabilities $\hat{I}*(k,l)$ for the (i,j)$^{th}$ spatial segment, and $\underline{w}_{ij}(k,l)$ are the beamformer weights for the (i,j)$^{th}$ beamformer directed at the (i,j)$^{th}$ spatial segment. The coefficients $\underline{w}_{res}(k,l)$ of the linear combination and the beamformer weights for the individual beamformers are here each represented by a M×1 vector (M rows, 1 column), where M is the number of input units, e.g. microphones.

Figure 10:
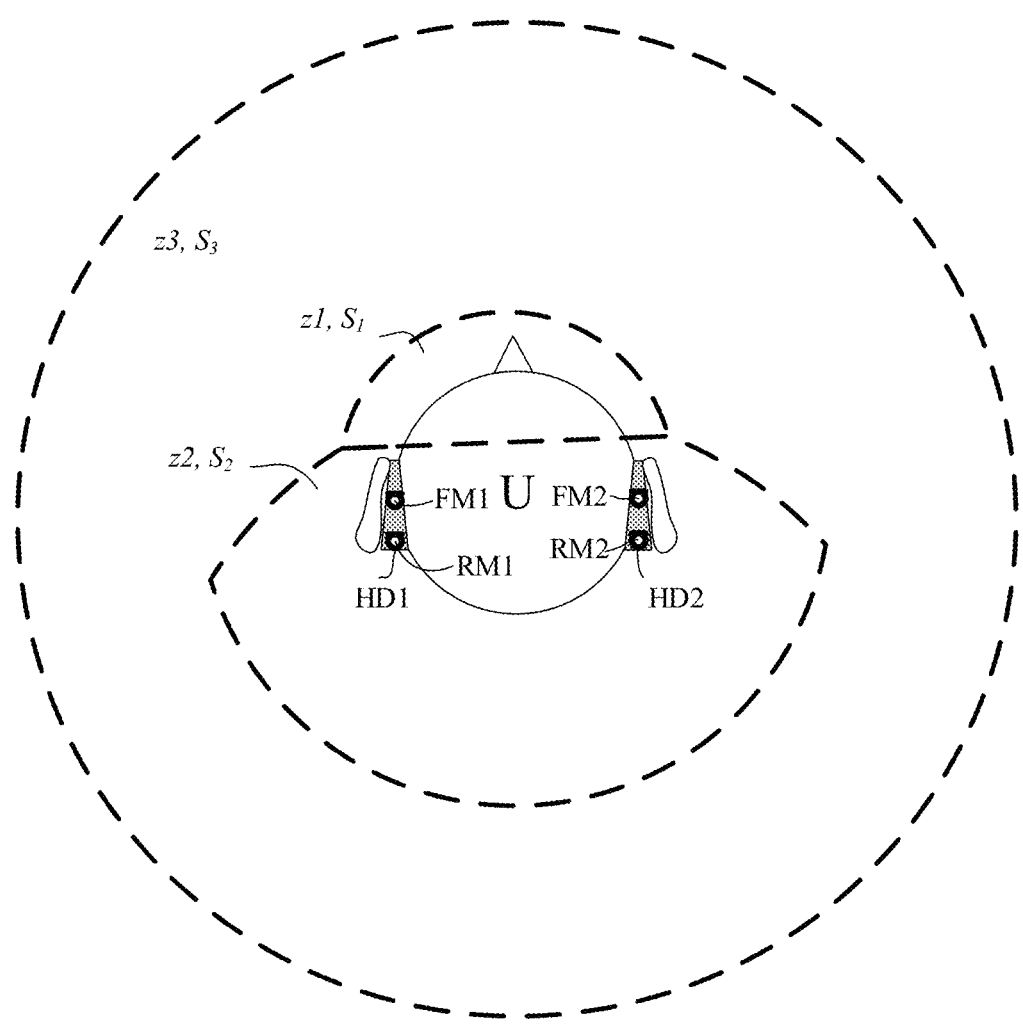
FIG. 10 shows an exemplary spatial decomposition focusing on estimation of own voice presence probability.
Figure 11:
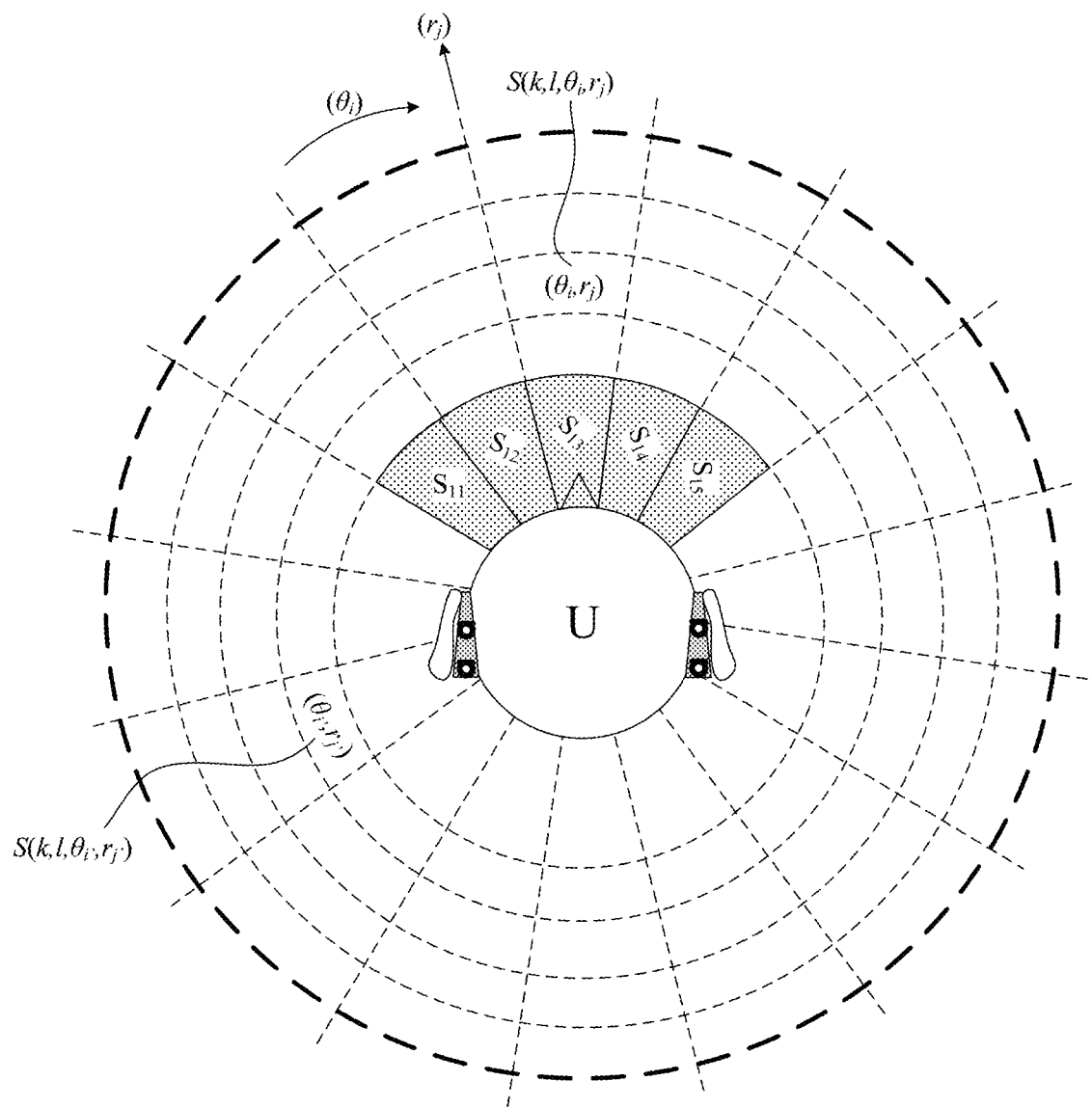
FIG. 11 shows a further exemplary spatial decomposition including a number of designated cells to be used for estimation of an own voice presence probability.

Own Voice:

FIG. 10 schematically illustrates an exemplary 'low dimensional' spatial decomposition focusing on estimation of own voice presence probability. The spatial distribution for own voice presence probability estimation comprises at least two cells, e.g. two, three or more cells. As illustrated in FIG. 10, the spatial distribution of cells comprises three spatial volumes, denoted z1, z2, z3 (with associated beamformed signals $S_1$, $S_2$, $S_3$), respectively. One of the spatial cells (z1) is located around the mouth of the user (U) of the hearing device or devices (HD1, HD2). The reference to a given spatial cell (z1, z2, z3) is intended also to refer to the signal ($S_1$, $S_2$, $S_3$) estimated by the beamformer for that cell. The configuration of cells is intended to utilize the concept of the present disclosure to create beamformers that each cover a specific cell and together cover the space around the user (or a selected part thereof), and to provide respective SPP-estimators for the individual spatial cells (segments). In the illustrated exemplary embodiment, the cell denoted z2 picks up sounds from behind, but close to, the user (which might be—mistakenly—taken as own voice). The cell denoted z3 picks up sounds from the environment around the user (exclusive of the near-field environment covered by cells z1 and z2). The cell z3 may cover the whole (remaining) space around the user, or be limited to a certain spatial angle or radius. In an embodiment of the segmentation of the space around the user, a single own voice cell (as e.g. indicated by z1 in FIG. 10) is provided. In another embodiment, or a number of (e.g. smaller) cells around the user's mouth, which together constitute an own voice cell, are provided. The group of own voice cells may form part of a larger segmentation of space as e.g. exemplified in FIG. 2 or FIG. 6. The latter is illustrated in FIG. 11. The spatial segmentation of FIG. 11 is equal to the spatial segmentation of FIG. 2. A difference is that in FIG. 11, the spatial segments around the user's mouth (segments denoted $S_{11}$, $S_{12}$, $S_{13}$, $S_{14}$, $S_{15}$, indicated in dotted filling) are predefined to possibly contain own voice. If the training data used to train the neural networks of a speech presence probability estimator of a given spatial cell includes own voice data of various SNR's, etc., the network will be able to discriminate between own voice and other voices. In the case that the training data do not include an own voice sound source, a qualification of the speech presence probability estimate regarding its origin from own voice or other voices may be included (e.g. using a criterion related to the signal level or sound pressure level (SPL); e.g. to decide that a given SPP of an own voice cell, e.g. z1 ($S_1$) in FIG. 10 or $S_{11}$-$S_{15}$ of FIG. 11) is assumed to relate to own voice, if the level or SPL is above a certain 'own voice threshold value', and otherwise that the SPP relates to another voice).

Figure 12A:
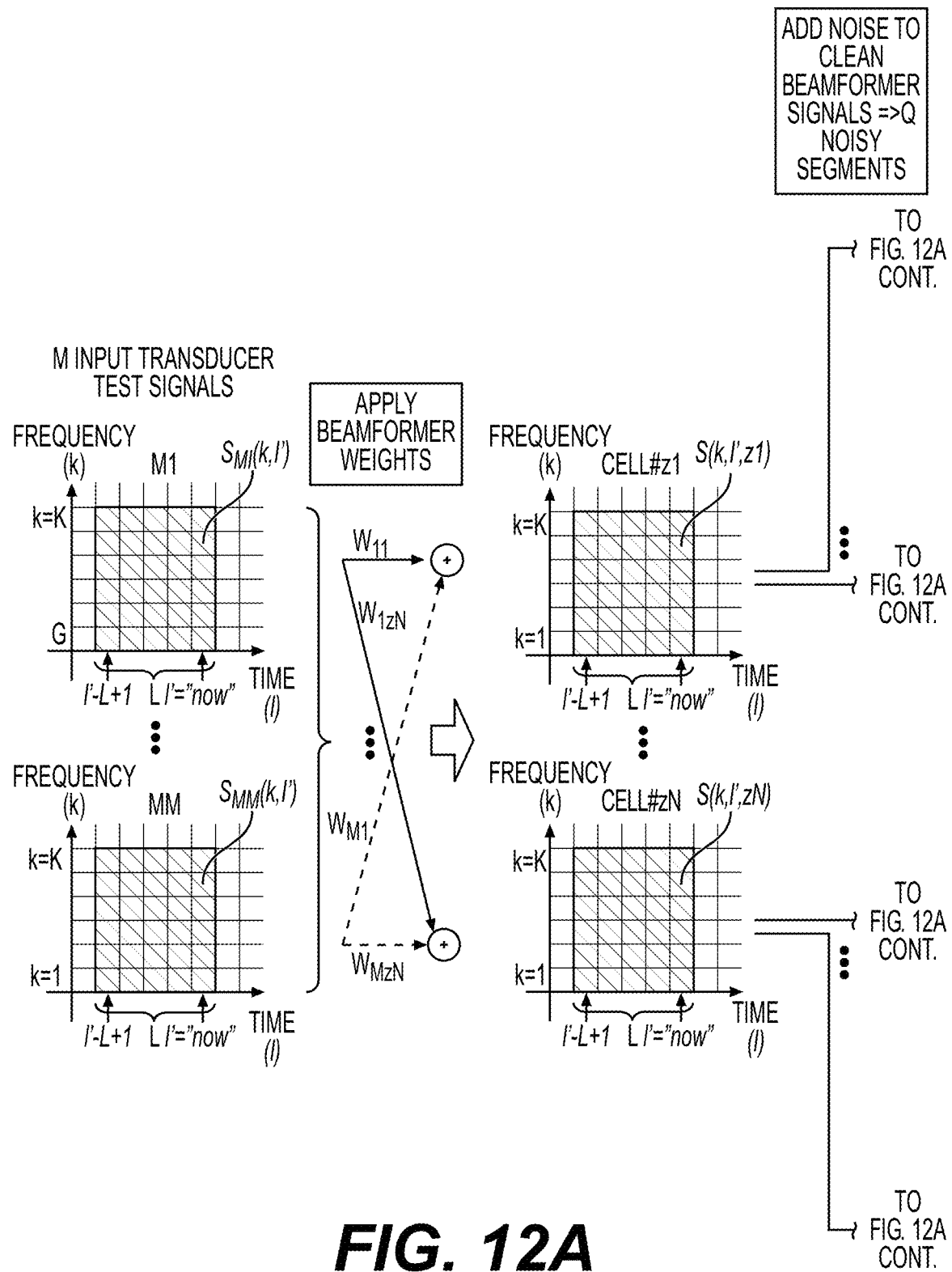
FIG. 12A illustrates a scheme for generating a test database of sound data for selecting a specific set of optimized parameters of a neural network among a number of pre-determined optimized parameters for different head models.
Figure 12A:
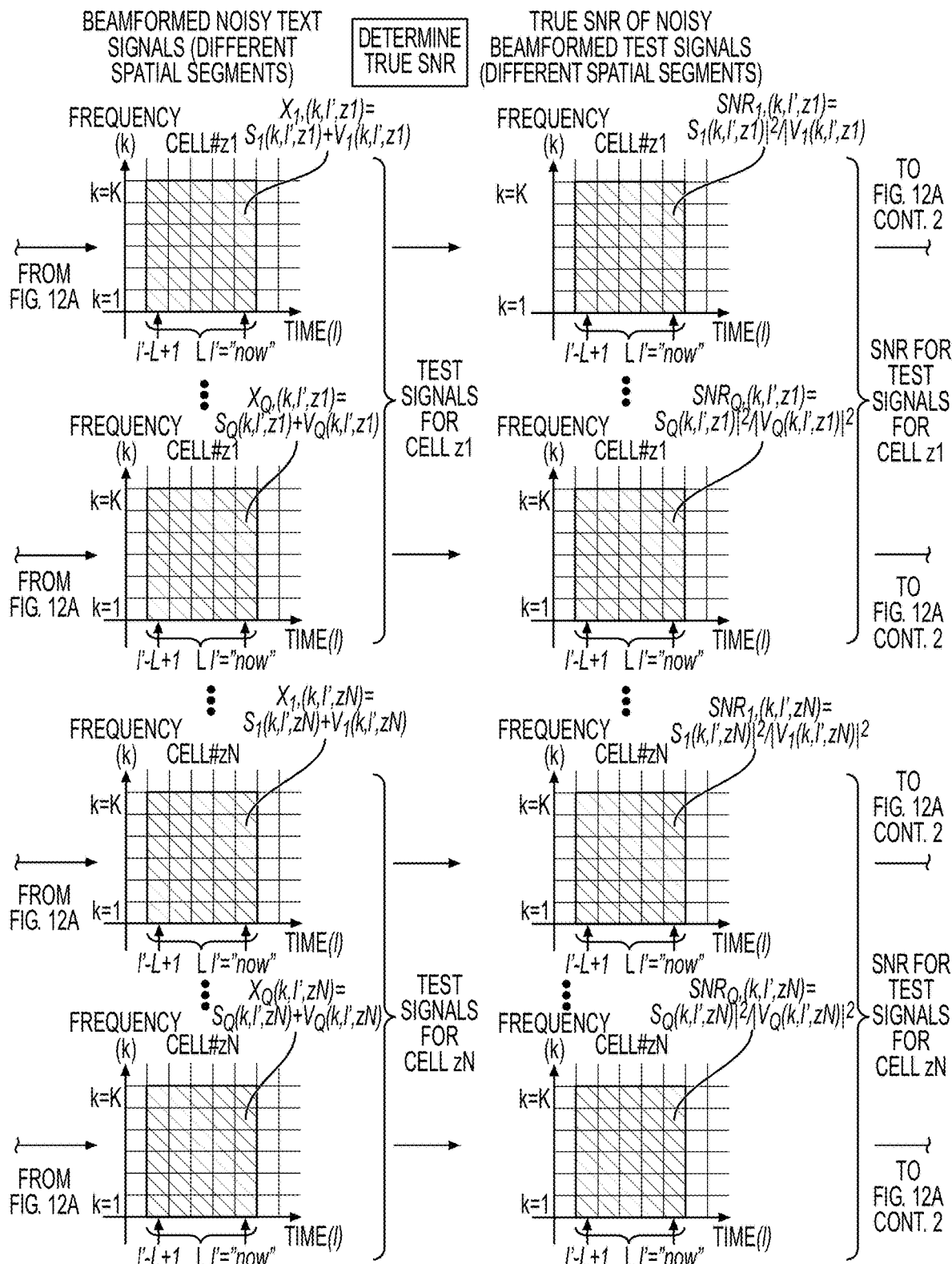
Figure 12B:
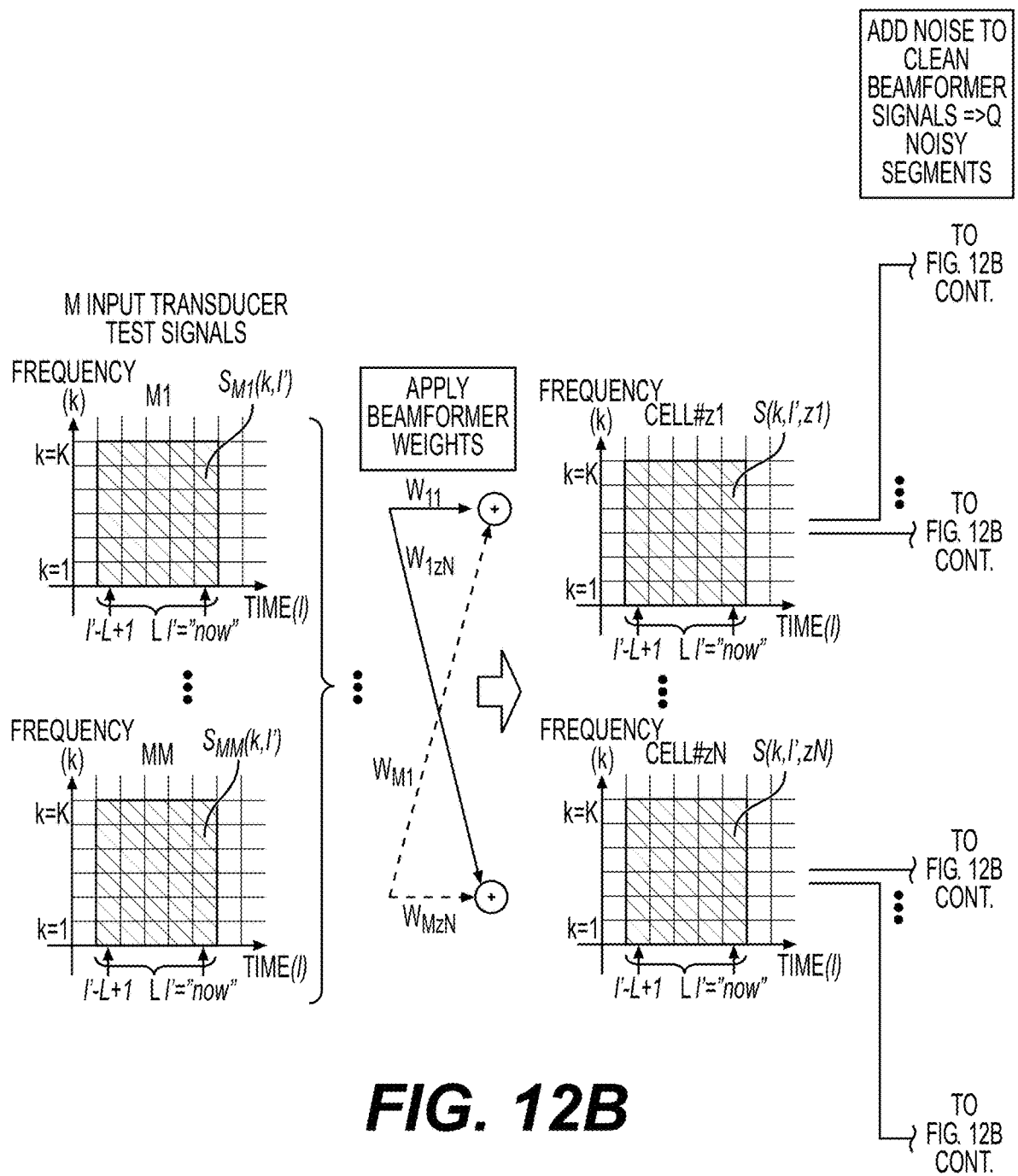
FIG. 12B illustrates a scheme for selecting a specific set of optimized parameters of a neural network among a number of pre-determined optimized parameters for different head models using the test database of sound data determined in FIG. 12A.
Figure 12B:
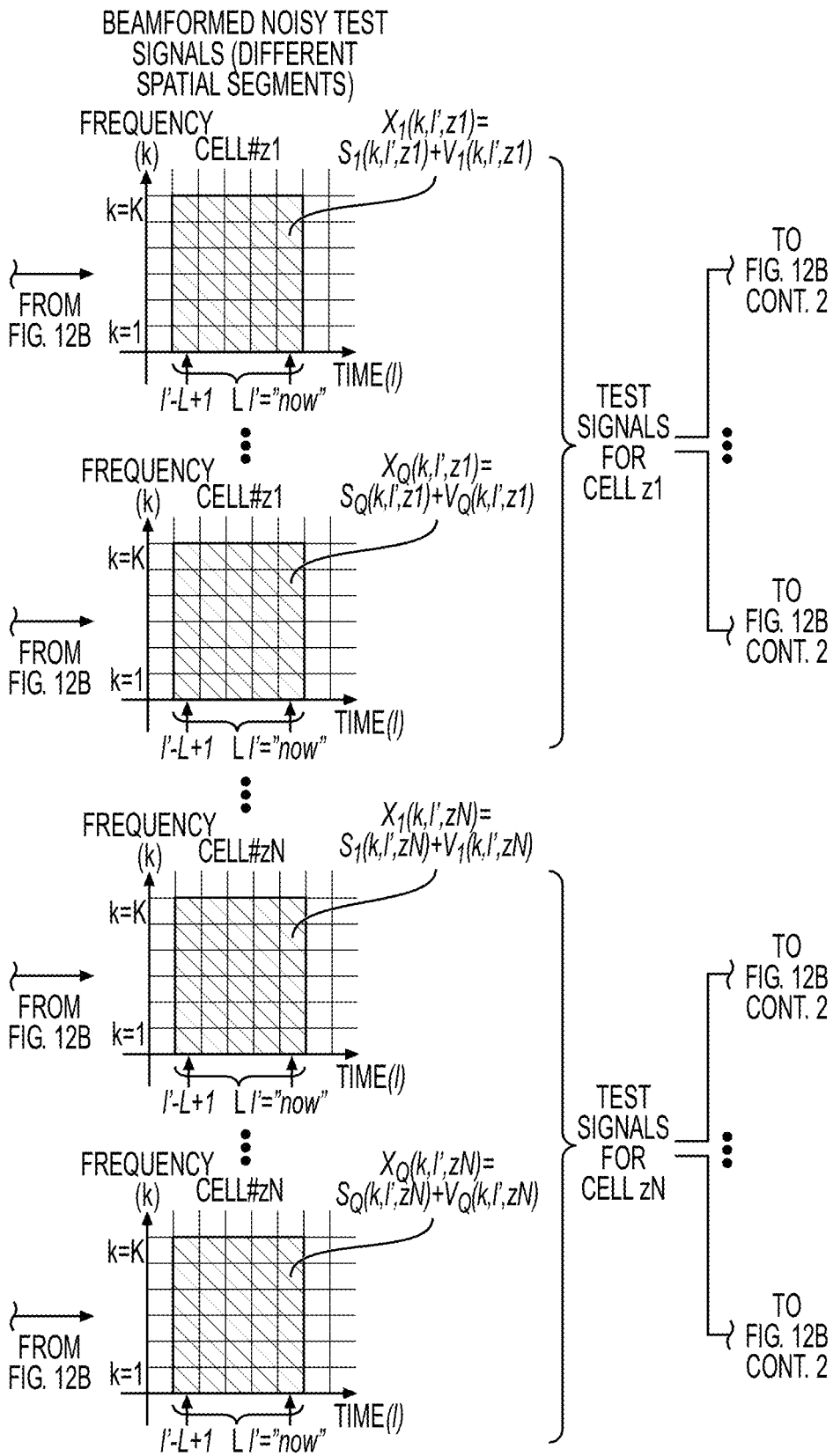

Personalization:

FIG. 12A illustrates a scheme for generating a test database of sound data for selecting a specific set of optimized parameters of a neural network among a number of pre-determined optimized parameters for different head models. FIG. 12B illustrates a scheme for selecting a specific set of optimized parameters of a neural network among a number of pre-determined optimized parameters for different head models using the test database of sound data determined in FIG. 12A.

As illustrated in FIG. 12A, 12B, from left to right, the method comprises

In FIG. 12A:

S1. Providing M input transducer (essentially noise free (clean)) test signals in a time frequency representation (k,l).

S2. Apply respective beamformers covering individual spatial segments (z1, ..., zN) around the user to provide (clean) beamformed test signals S(z) for the individual spatial segments.

S3. Add various (known) amounts of noise to the clean beam formed signals to provide a test database of noisy beamformed time segments for (e.g. each of) the individual spatial segments.

S4. Determine true signal to noise ratios (SNR) of the individual time-frequency tiles of each noisy beamformed test signal.

S5. Determine true speech presence measures (TSPM) of the individual time-frequency tiles of each noisy beamformed test signal.

In FIG. 12B:

Steps S1, S2, S3 of FIG. 12A (or select noisy beamformed time segments for (e.g. each of) the individual spatial segments from a test database of sound signals).

S6. Apply noisy beamformed time segments for (e.g. each of) the individual spatial segments from a test database of sound signals to optimized algorithms for different head models to provide corresponding speech presence probabilities (SPP) for each model and time segment for a given spatial segment (or all spatial segments).

S7. Convert speech presence probabilities (SPP) to (test) speech presence measures (SPM).

S8. Compare true (TSPM) and test (SPM) speech presence measures and provide a comparison speech presence measure for each spatial segment (or for all spatial segments).

S9. Select an optimal head model, HM*, in dependence of the comparison speech presence measure and a cost function.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

[1] R. C. Hendriks, T. Gerkmann, and J. Jensen, DFT-Domain Based Single-Microphone Noise Reduction for Speech Enhancement. Morgan and Claypool, 2013.
[2] J. Heymann, L. Drufe, and R. Haeb-Umbach, "A Generic Acoustic Beamforming Architecture for Robust Multi-Channel speech Processing," Computer, Speech and Language, Volume 46, November 2017, Pages 374-385.
[3] J. R. Deller, J. H. L. Hansen, and J. G. Proakis, Discrete-Time Processing of Speech Signals. Wiley-IEEE Press, 1999.
[4] I. Goodfellow, Y. Bengio, and A. Courville, Deep Learning. MIT Press, 2016, http://www.deeplearningbook.org.
[5] K. L. Bell, Y. Ephraim, and J. L. V. Trees, "A Bayesian Approach to Robust Adaptive Bean forming," IEEE Trans. Signal Processing, vol. 48, no. 2, pp. 386-398, February 2000.

The invention claimed is:

1. A method of providing an estimate $\hat{I}^*$ of a speech presence probability in a sound signal comprising speech and additive noise or other distortions in a hearing device the hearing device comprising a multitude of input units each providing an electric input signal representing said sound signal in a time-frequency representation (k,l), the method comprising
    providing a subdivision of space around the user in a multitude of spatial segments (i,j);
    providing a speech presence indicator function, which for a given electric input signal indicates whether or not, or to which extent, speech is present in a given spatial segment (i,j), at a given frequency and time (k,l); and, for each spatial segment (i,j)
        providing a first database ($\Psi_{ij}$) of training signals comprising a multitude of pairs of corresponding noisy beamformed signals $X(k,l,74_i,r_j)$ representative of sound in the spatial segment in question and associated values of said speech presence indicator function $I(k,l,74_i,r_j)$ in a time frequency representation, wherein said values of said speech presence indicator function represent ground truth values; and
    determining optimized parameters ($\Psi^*_{ij}$) of an algorithm for estimating said speech presence probability by optimizing, e.g. training, it with at least some of said noisy beamformed signals $X(k,l,\theta_i,r_j)$ and said associated values of said speech presence indicator function $I(k,l,\theta_i,r_j)$ in of said first database ($\Psi_{ij}$), the algorithm providing corresponding estimated speech presence indicator values $\hat{I}(k,l,\theta_i,r_j)$, said optimization of parameters ($\Psi^*_{ij}$) being conducted under a constraint of minimizing a cost function of said estimated speech presence indicator values.

2. A method according to claim 1 wherein said multitude of spatial segments comprises an own voice segment including a segment around the user's mouth to allow for estimating a speech presence probability of the user of the hearing device.

3. A method according to claim 1 wherein a multitude of clean electric input signals $S_m(k,l)$, m=1, . . . , M, for each of said multitude of input units are generated (or recorded) by varying one or more of
    1) the target speech source;
    2) the target spatial position $(\theta_i,r_j)$;
    3) head size;
    4) input unit.

4. A method according to claim 3 wherein said noisy beamformed signals $X(k,l,\theta_i,r_j)$ are generated based on said clean electric input signals $S_m(k,l)$, m=1, . . . , M, by varying one or more, such as all of
    a) the additive noise or other distortion type,
    b) the signal-to-noise ratio (SNR) at which the target signal is typically observed in practice, in the application at hand,
    to thereby generate noisy electric input signals $X_m(k,l)$, m=1, . . . , M, corresponding to said clean electric input signals; and by exposing said noisy electric input signals to respective beamformers providing said noisy beamformed signals $X(k,l,\theta_i,r_j)$ representative of sound in the spatial segments in question.

5. A method according to claim 1 comprising the provision of a number of sets of semi-personalized, optimized parameters ($\Psi^*_{ij}$) of said algorithm for estimating a speech presence probability for a given spatial segment.

6. A method according to claim 4 comprising wherein said sets of semi-personalized, optimized parameters ($\Psi^*_{ij}$) of said algorithm are associated with a corresponding number of different head models having different head dimensions or form.

7. A method according to claim 6 comprising, providing that one of said sets of semi-personalized, optimized parameters ($\Psi^*_{ij}$) of said algorithm for said different head models is selected for use in the hearing device of the user based on test training data of sound signals played for the user while wearing the hearing device.

8. A method of operating a hearing device, the method comprising:
    providing a multitude of electric input signals representing sound in the environment of the user in a time-frequency representation, wherein the sound is a mixture of speech and additive noise or other distortions;
    providing a multitude of beamformed signals, each being representative of the sound in a different one of a multitude of spatial segments around the user, and each being based on at least two of said multitude of electric input signals;

providing for each of said multitude of spatial segments an estimate of a probability Pij(k,l) that the spatial segment in question contains speech at a given point in time and frequency in dependence of the beamformed signals; and wherein at least one of the multitude of estimates of speech probability is/are provided by a trained neural network, wherein said at least one of the multitude of estimates of speech probability is provided by a neural network trained according to the method of claim 1.

9. A hearing device according configured to he worn by a user comprising:

a multitude of input units, each providing an electric input signal representing sound in the environment of the user in a time-frequency representation, wherein the sound is a mixture of speech and additive noise or other distortions;

a multitude of beamformer filtering units, each being configured to receive at least two of said multitude of electric input signals, each of said multitude of beamformer filtering units being configured to provide a beamformed signal representative of the sound in a different one of a multitude of spatial segments; and a multitude of speech probability estimators each configured to receive the beamformed signal for a particular spatial segment and to estimate a probability that said particular spatial segment contains speech at a given point in time and frequency; and wherein at least one of the multitude of speech probability estimators is/are implemented as a trained neural network, and the at least one of the multitude of speech probability estimators is/are implemented as a trained neural network according to the method of claim 1.

\* \* \* \* \*